United States Patent
Freudenberg et al.

(10) Patent No.: US 9,764,937 B2
(45) Date of Patent: Sep. 19, 2017

(54) MASS BASED LOW PRODUCT INDICATOR

(71) Applicant: ECOLAB USA INC., St. Paul, MN (US)

(72) Inventors: Jared R. Freudenberg, St. Louis Park, MN (US); Ryan Urban, Mahtomedi, MN (US); Ryan Joseph Drake, White Bear Lake, MN (US); Ryan A. Chernik, St. Anthony, MN (US); Troy A. Anderson, Eagan, MN (US)

(73) Assignee: Ecolab USA Inc., Saint Paul, MN (US)

( * ) Notice: Subject to any disclaimer, the term of this patent is extended or adjusted under 35 U.S.C. 154(b) by 0 days.

(21) Appl. No.: 13/895,100

(22) Filed: May 15, 2013

(65) Prior Publication Data
US 2014/0339255 A1    Nov. 20, 2014

(51) Int. Cl.
*B67D 7/08* (2010.01)
*B67D 7/32* (2010.01)
*B67D 7/02* (2010.01)
*B65D 83/00* (2006.01)
*B67D 7/84* (2010.01)
(Continued)

(52) U.S. Cl.
CPC .......... *B67D 7/3209* (2013.01); *B65D 83/00* (2013.01); *B67D 7/02* (2013.01); *B67D 7/741* (2013.01); *B67D 7/84* (2013.01); *B67D 2210/0012* (2013.01); *G01F 23/20* (2013.01)

(58) Field of Classification Search
CPC ......... G01F 23/20; B67D 7/3209; B67D 7/02; B67D 7/741; B67D 7/84; B67D 2210/0012; B65D 83/00
USPC .......... 222/41, 58, 77, 49, 50, 183; 177/168, 177/233, 50, 245, 232; 73/296
See application file for complete search history.

(56) References Cited

U.S. PATENT DOCUMENTS

| | | | |
|---|---|---|---|
| 698,334 A | * | 4/1902 | Smith ......................... 177/234 |
| 2,015,689 A | * | 10/1935 | Odell ..................... G01F 23/20 |
| | | | 137/551 |

(Continued)

FOREIGN PATENT DOCUMENTS

| | | |
|---|---|---|
| FR | 1180118 | 6/1959 |
| GB | 1 349 945 | 4/1974 |

(Continued)

OTHER PUBLICATIONS

ECOLAB USA Inc., PCT/US2014/037600, "Notification of Transmittal of the International Search Report and the Written Opinion of the International Searching Authority, or the Declaration", mailed Sep. 1, 2014.

*Primary Examiner* — Charles P Cheyney
(74) *Attorney, Agent, or Firm* — McKee, Voorhees & Sease, PLC

(57) ABSTRACT

A dispenser dispenses a consumable product from a container. The container is supported within a housing by a container holder. The container holder is vertically moveable within a movement range in the housing. A biasing structure biases the container holder upwardly. A sign is connected to move up and down with the container holder. An indicator associated with the sign is vertically fixed relative to the housing. When an amount of product remaining in the container reaches a low level, the biasing force of the biasing structure will lift the container holder, causing the indicator to be aligned with a portion of the sign that gives a visual cue to a user that the amount of product remaining is at a low level.

20 Claims, 24 Drawing Sheets

(51) Int. Cl.
*G01F 23/20* (2006.01)
*B67D 7/74* (2010.01)

(56) References Cited

U.S. PATENT DOCUMENTS

| | | | | |
|---|---|---|---|---|
| 2,069,499 A | * | 2/1937 | Marin | G01G 3/02 |
| | | | | 177/132 |
| 2,330,857 A | * | 10/1943 | Alcott | 177/45 |
| 2,831,610 A | * | 4/1958 | Dennie | B65D 5/5059 |
| | | | | 222/105 |
| 3,319,730 A | * | 5/1967 | Cuddon-Fletcher | 177/233 |
| 3,425,415 A | * | 2/1969 | Gordon et al. | 604/153 |
| 3,565,197 A | * | 2/1971 | Carter | G01G 3/00 |
| | | | | 100/215 |
| 3,768,696 A | | 10/1973 | Laerdal | |
| 4,078,625 A | | 3/1978 | Loeb | |
| 4,320,855 A | * | 3/1982 | Ricciardi et al. | 222/56 |
| 4,382,478 A | * | 5/1983 | Hearn | 177/169 |
| 4,474,255 A | * | 10/1984 | Blok et al. | 177/146 |
| 4,491,023 A | | 1/1985 | Graef | |
| 4,745,852 A | * | 5/1988 | Sager | A47J 31/402 |
| | | | | 99/280 |
| 4,886,189 A | * | 12/1989 | Vanderjagt | 222/49 |
| 5,118,010 A | * | 6/1992 | Jeans | 222/3 |
| 5,156,297 A | * | 10/1992 | Engler | G01G 17/04 |
| | | | | 141/83 |
| 5,686,704 A | | 11/1997 | Simser | |
| 5,782,382 A | * | 7/1998 | Van Marcke | 222/52 |
| 5,864,097 A | | 1/1999 | Alvino | |
| 6,246,017 B1 | | 6/2001 | Yang | |
| 6,325,113 B1 | | 12/2001 | Hathaway et al. | |
| 6,516,625 B2 | * | 2/2003 | Bedard | B67D 1/0043 |
| | | | | 62/389 |
| 6,649,850 B2 | | 11/2003 | Strohmeier | |
| 6,976,286 B1 | * | 12/2005 | Sanabria | A47J 47/18 |
| | | | | 134/186 |
| 6,978,671 B1 | | 12/2005 | Meggs et al. | |
| 7,694,849 B1 | * | 4/2010 | Wiesner | 222/1 |
| 7,931,174 B2 | | 4/2011 | Finlay et al. | |
| 8,534,497 B2 | * | 9/2013 | Veltrop et al. | 222/1 |
| 8,763,857 B2 | * | 7/2014 | Middleton | 222/95 |
| 8,777,059 B2 | * | 7/2014 | Middleton | 222/103 |
| 8,944,249 B1 | * | 2/2015 | Mullaney | B65F 1/14 |
| | | | | 177/144 |
| 2002/0047021 A1 | | 4/2002 | Blacker et al. | |
| 2003/0047178 A1 | * | 3/2003 | Barth | A47J 37/0713 |
| | | | | 126/41 R |
| 2008/0000931 A1 | * | 1/2008 | Tichy et al. | 222/212 |
| 2009/0120956 A1 | * | 5/2009 | De La Fe Dahlin | 222/95 |
| 2010/0264096 A1 | | 10/2010 | Ince et al. | |
| 2012/0223158 A1 | | 9/2012 | Orubor | |

FOREIGN PATENT DOCUMENTS

| | | |
|---|---|---|
| GB | 2 452 607 A | 3/2009 |
| WO | 2005094642 A1 | 10/2005 |

* cited by examiner

MASS BASED LOW PRODUCT INDICATOR

FIELD OF THE INVENTION

This invention relates generally to dispensers that dispense a product from a container. More specifically, this invention relates to apparatuses and methods for indicating when the level of product remaining in the container is low, such that the container may need to be replaced or refilled.

BACKGROUND OF THE INVENTION

Dispensers that dispense a consumable product from a container have many uses. In general, such dispensers will have an outlet that is fluidly connected to the container to draw the consumable product out of the container and eventually out of the outlet. The product may be mixed with a liquid, such as a diluent to form a mixture, either before or after reaching the outlet. As the consumable product is dispensed, the level of consumable product remaining within the product container will drop, until the container is eventually empty or nearly empty, such that no more of the consumable product can be effectively withdrawn from the container. It is therefore desirable for a user to know when the level of the product within the container is getting low, so that the user can have a replacement container or supply of product available so that downtime when the container runs out of product is minimized.

For products that can be stored in translucent containers it may be possible for a user to simply visually inspect the container to determine when the container has reached a low level, such that the container may soon be expected to run out of product. However, some products degrade when exposed to light, or other types of radiation, such as ultraviolet (UV) radiation. Such degradable products need to be stored in opaque containers or that prevent visual inspection of level of product remaining within the container. Alternatively, the container itself may be hidden from view within housing other protective cover.

Accordingly, there is a need for mechanisms that permit a user to check whether a consumable product within a container is at a low level or has been exhausted of a container. For example, peroxyacietic acid mixed with hydrogen peroxide forms a cleaning concentrate that can be diluted with water to form a mixture that has a broad spectrum efficacy against most viruses and bacteria, which makes the solution useful in both the food and beverage market and the health care market. Such a concentrate must be stored in opaque bottles to prevent the concentrate from UV degradation. U.S. Provisional Patent Application 61/734,532, filed Dec. 7, 2012, related to a system for handling displacement of liquid products, the entire contents of which are hereby incorporated by reference, describes a dispenser that may be used to dispense a cleaning solution using such a product. Such dispensers would benefit from a convenient, reliable mechanism for indicating that the concentrate container is running low on product. Preferably such a system would not require a supply of electricity, and could be verified without the need to access the container directly, which will preferably be retained within a locked compartment.

Many dispensers include a disposable or refillable container of concentrated product. The chemistry of these concentrated products often make them dangerous to humans or the environment in their concentrated form. Accordingly, it is desirable to have a mechanism for containing and disposing of any accidental spills or catastrophic failures of the concentrated product from the container. Preferably, such a mechanism will retain the spilled concentrated product within the dispenser, and will allow for convenient and safe cleanup and disposal of the spilled concentrated product.

SUMMARY OF THE INVENTION

According to one embodiment the present invention is a dispenser that dispenses a product. The dispenser includes an outer housing. A product container contains a product, and the product has a product level within the product container that ranges between full and empty. A low product level is defined wherein the product level within the container is nearly empty. The dispensing apparatus is associated with the product container to withdraw and dispense product from the product container to an outlet. The container holder supports the container within the housing. The container holder is vertically moveable within a movement range. A biasing element supports the container holder within the housing, and urges the container holder upwardly such that the position of the product container in the movement range is dependent upon the product level in the product container. A level indicator is vertically fixed relative to the housing, and a sign is vertically fixed relative to the container holder. The sign includes a low level marking at an upper portion of the sign to indicate when the product level is at the low level or lower. When the product level is at the low level or lower, the level indicator aligns with a portion of the low level marking. When the product level is full, the container holder is at a bottom of the movement range. When the product level is between full and the low level, the container holder remains at the bottom of the movement range. The biasing element may comprise a pair of extension springs. A U-shaped bracket having a base fixed to the housing and a pair of legs extending from the base, with each leg including a spring attachment structure may be provided. A pair of spring attachment hooks may be provided at an upper portion of the container holder. The pair of extension springs may be connected between the spring attachment structures on the U-shaped bracket and the spring attachment hooks on the container holder. The low level marking may be a swatch of color different than a color on an upper portion of the sign. The low level indicator may be an opening through the housing. The housing may include a product container holder compartment and a door that selectively opens and closes the product container holder compartment. The level indicator may be a window through the door. The dispensing apparatus may include a connection to a water supply, and the dispensing apparatus may dispense a mixture of water and the product at the outlet.

According to one embodiment, the present invention is directed to a dispenser that dispenses a product and diluent mixture. The dispenser includes a housing that has a storage area and a dispensing area. An outlet in the dispensing area dispenses the mixture. The outlet is in fluid communication with a diluent source and a product container. A container holder supports the product container within the storage area. The container holder is vertically moveable within a movement range between an upper limit and lower limit. A level indicator is vertically fixed relative to the housing. A sign is connected with the container holder such that vertical movement of the container holder within the movement range causes corresponding movement of the sign relative to the level indicator. The sign includes a low level marking to indicate a low level of concentrate remaining within the concentrate container. A biasing device is operable between the housing and the container holder in order to bias the container holder towards the upper limit of the movement range. When the product container contains a low level of product, the biasing device will move the container holder to an intermediate position above the lower limit of the movement range thereby moving the sign to a low level position wherein the level indicator is aligned with the low level marking on the sign.

According to another embodiment, the present invention is directed to a dispenser. The dispenser has a housing that includes a container support for supporting a container containing a concentrated product. The container having a capacity equal to a container volume. A dispensing outlet is provided on the housing to dispense a diluted mixture of the product. A secondary container is provided below the product container support for catching and retaining concentrated product spilled from the container. The secondary container is releasably connected to the housing. The secondary container may also include a lid that covers an upper opening of the secondary container, with the lid having a drainage opening to permit spilled product to flow into the secondary container. The lid may include a sloped upper surface that slopes downwardly to the drainage opening. The secondary container may have a floor and at least one baffle extending upwardly from the floor a sufficient distance to retard sloshing of concentrated product within the container. The floor of the secondary container may include a flat section to accommodate a neutralizing agent packet. The secondary container may have a capacity equal to or greater than the container volume. The housing may include a door that covers a storage compartment where the container support is provided. The secondary container may include a projection in alignment with the door when the door is in a closed position, such that the secondary container is prevented from being disconnected from the housing when the door is closed by virtue of the door interfering with the projection. When the door is in a fully open position, the projection is not aligned with the door, such that disconnection of the secondary container from the housing is permitted. The dispenser may include a bucket fill attachment that stores upon a lid of the secondary container when not in use and that attaches to the housing proximate to the outlet when in use. The secondary container may include walls that define a passageway from below the secondary container to above the secondary container to accommodate a hose connected to the bucket fill attachment from below the housing. The passageway may be open to a rear portion of the secondary container such that the hose within the passageway does not interfere with disconnecting the secondary container from the housing. The secondary container may be slidably received within the housing and the housing may include a guide that interacts with the secondary container to constrain a movement path of the secondary container. The guide may constrain the movement to slide to a first position partway out of the housing, to lift to a second position where at least a portion of the secondary container is above the first position, and then slide completely out of the housing. The guide may be a stepped bar having a lower step toward a rear of the guide and an upper step toward a front of the guide. The secondary container may include a flange that engages the guide.

DETAILED DESCRIPTION OF THE PREFERRED EMBODIMENTS

Figure 1A:
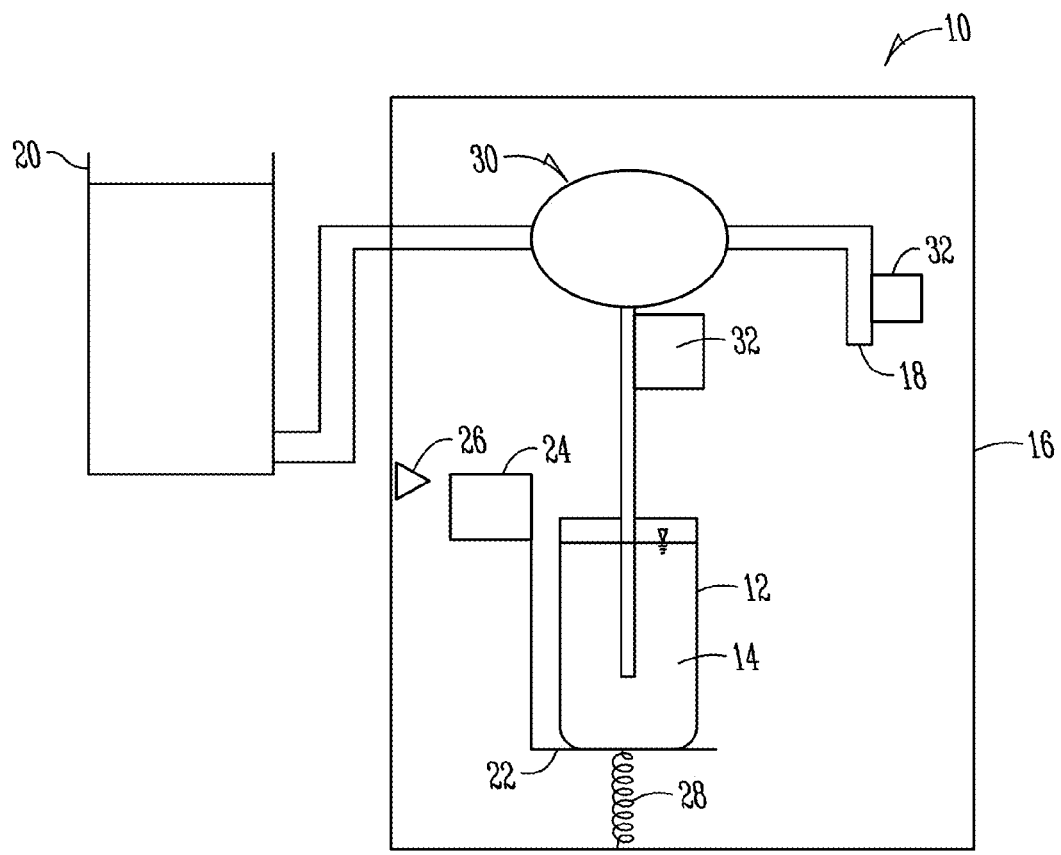
FIG. 1A shows a front elevation view of a dispenser according to one embodiment of the present invention, wherein a low product indicator uses a compression spring, and wherein the consumable container is nearly full.

FIG. 1A is a front elevation view of a dispenser 10 according to one embodiment of the present invention. The components of the dispenser 10 are generally contained within a housing 16. The dispenser 10 is used to dispense a product 14 from a product container 12. The product 14 may be a concentrated liquid, such as a cleaning or disinfecting product. Alternatively, the product 14 may be any type of consumable that is dispensed from a container, such as a liquid, powder, or aerosol. An outlet 18 is provided as part of the dispenser 10 where the product 14 is dispensed to a user. In the embodiment of FIG. 1A, the dispenser 10 includes a diluent source 20, such that a mixture of the product 14 and diluent 20 can be dispensed at the outlet 18. In other embodiments, the consumable product 14 may be dispensed without being diluted. Typically, if a diluent 20 is used, it will be water, and the diluent source 20 may be a water supply.

The product container 12 may be connected with a manifold assembly 30 that is used to move the product 14 to the outlet 18, and to mix the product 14 with the diluent 20. A variety of manifold systems 30 may be suitable for use advantageously with the present invention. In particular, a system and assembly for handling liquid products that would be suitable for use as the manifold assembly 30 is shown in U.S. Provisional Patent Application No. 61/734,532, the entire contents of which are hereby incorporated by reference. The manifold assembly 30 may include controls 32 for controlling the dispensing of product 14 from the dispenser 10.

Figure 1B:
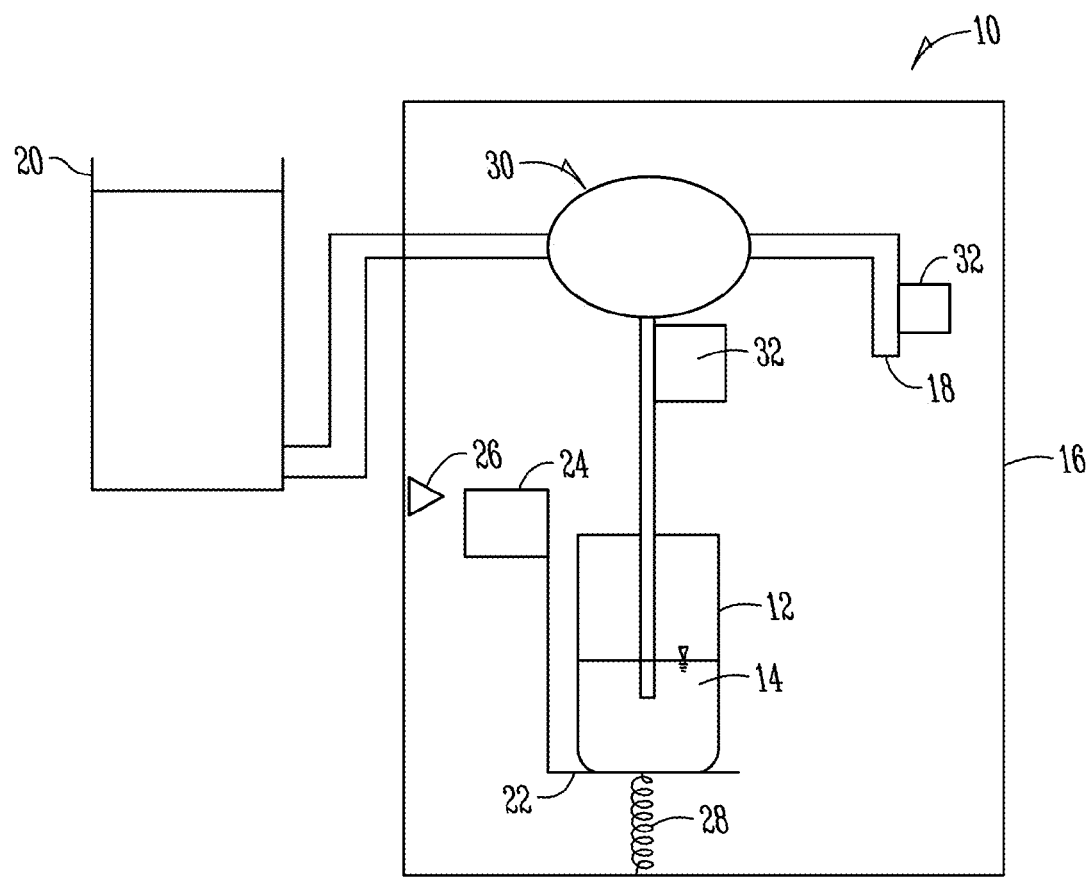
FIG. 1B shows the dispenser of FIG. 1A, wherein the consumable container is half empty.
Figure 1C:
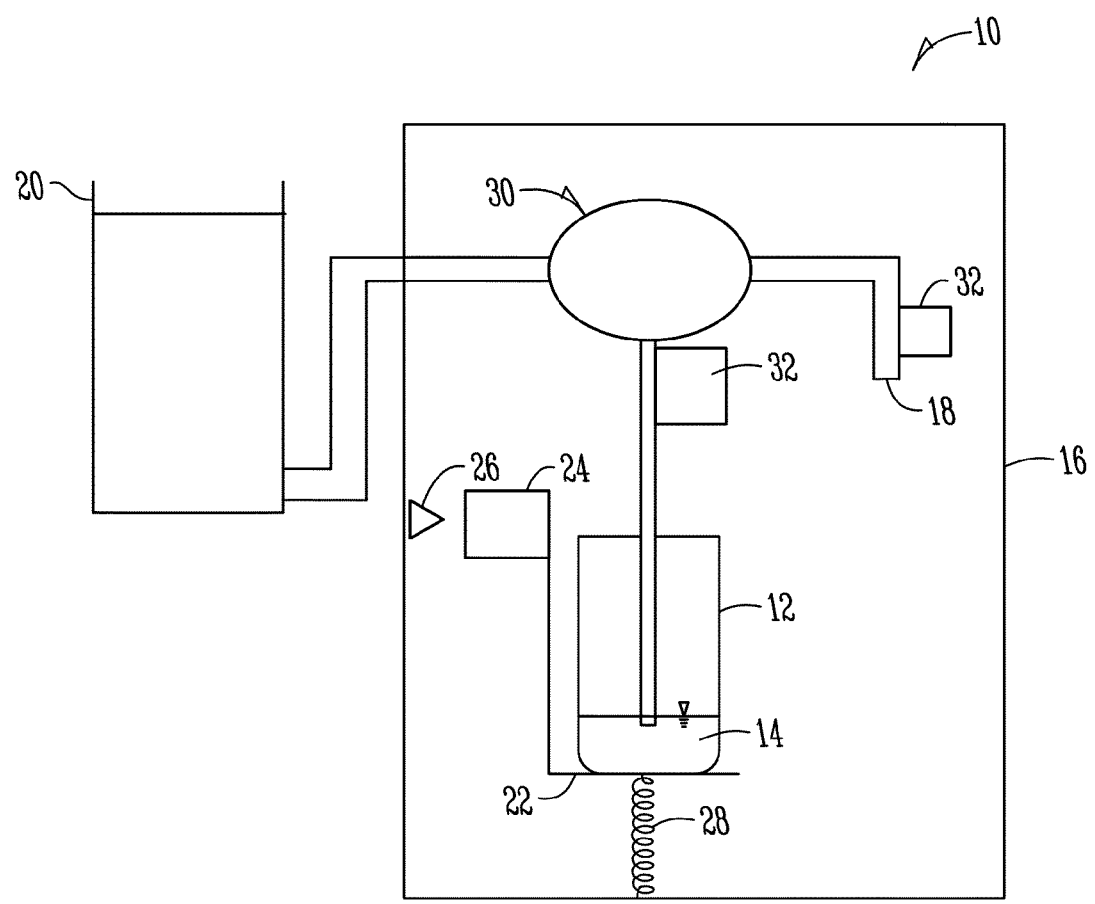
FIG. 1C shows the dispenser of FIG. 1B, wherein the consumable container has a low level of product remaining.
Figure 1D:
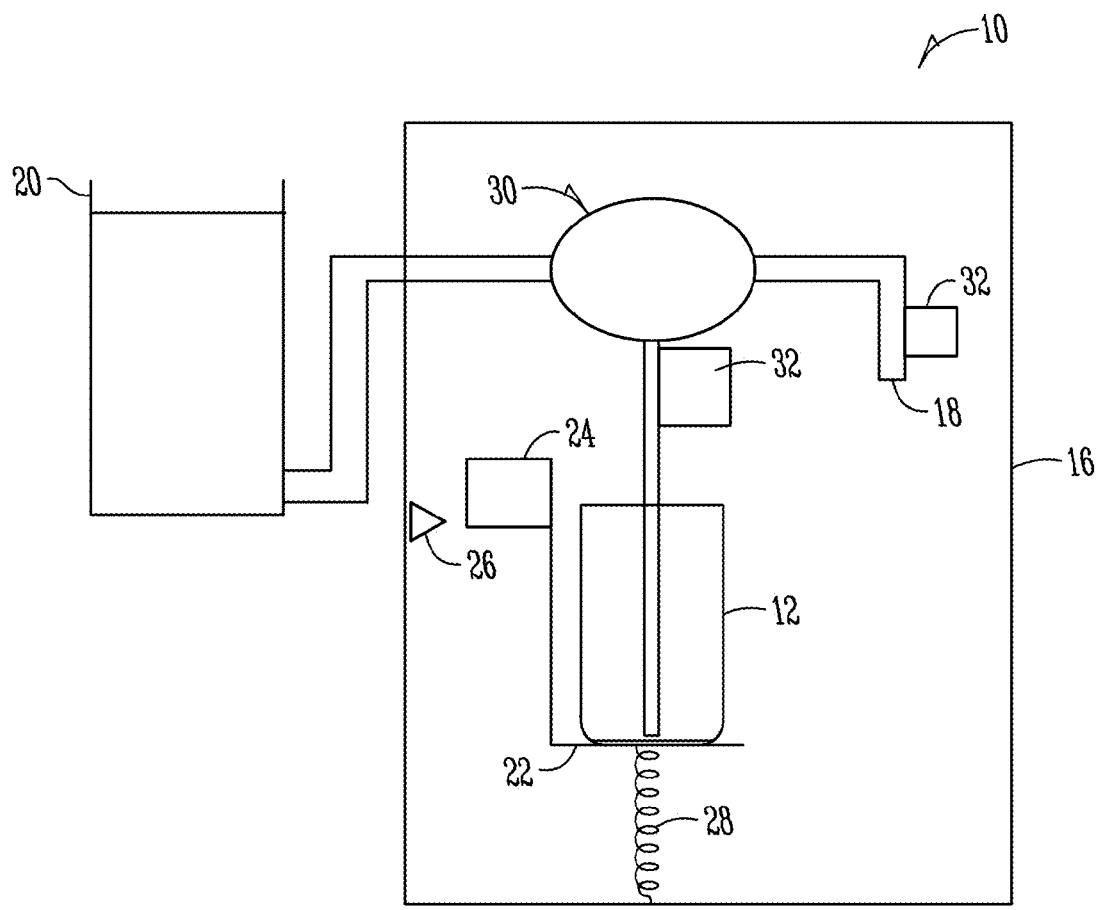
FIG. 1D shows the dispenser of FIG. 1C, wherein the consumable container is nearly empty.

As a user uses the dispenser 10 the product 14 will be consumed, and a level of product remaining within container 12 will become lower. For example, in FIG. 1A the level of product 14 remaining within container 12 is nearly at the top of the container 12. In FIG. 1B, only about half of the product 14 remains within container 12. In FIG. 1C, the product 14 is at a low level within the container 12, such that the container 12 will need to be replaced or refilled very soon. In FIG. 1D the product 14 has been completely, or nearly completely depleted from the container 12, such that the container 12 must be replaced or refilled in order to dispense any more product 14 from the dispenser 10.

It can be advantageous for a user to know in advance, before the container 12 reaches the state of FIG. 1D wherein the container 12 needs to be replaced or refilled in the near future, so that a user does not face a situation wherein the container 12 is out of product and no replacement product is available. The dispenser 10 of FIGS. 1A-D includes a low product indicator to provide a user with such advance warning.

The components of the low product indicator include a container holder 22 that supports the product container 12 within the housing 16. The container holder 22 is in turn supported within the housing 16 by a biasing device 28, such as a compression spring. Alternatively, more than one compression spring could be used as the biasing device 28. When the product container 12 is full, or nearly full, of product 14, the weight of the container 12 pressing against the container holder 22 will fully compress the compression spring 28. In the fully compressed position, the container holder 22 may come to a hard stop, such that its weight is at least partially support by a ledge or other structure within the housing 16. A sign 24, or similar display is attached to the container holder 22, such that the sign 24 will move up and down in conjunction with the container holder 22. The sign 24 may include markings, or other indicia, that represent a product level or levels remaining within the container 12. For example, the sign 24 may be divided in half, with a top half being green to represent that the container 12 has a sufficient supply of product 14 to last for a while, and a bottom half of sign 24 may be red to indicate that the level of product 14 remaining within container 12 is low, such that the container 12 may need to be replaced or refilled. An indicator 26 may be fixed vertically within the housing 16 to point to or otherwise indicate a specific portion of the sign 24 that relates to the current level of product 14 remaining within container 12. In FIG. 1A, with the compression spring 28 fully compressed, the indicator 26 is pointing towards a top portion of the sign 24 to indicate that the amount of product 14 remaining in the container 12 is not low.

In FIG. 1B, a significant portion of the product 14 has been consumed from the container 12, such that the level of product remaining within the container 12 is lower than the amount of product remaining in the container 12 shown in FIG. 1A. However, the compression spring 28 is still in the fully compressed condition, such that the indicator 26 is pointing towards the top portion of sign 24 to show that the level of product 14 remaining within container 12 is still not low. The biasing device 28 is selected such that it will not significantly move the container holder 22 upwards until the level of product 14 remaining within container 12 reaches a desired set point that is associated with a low product condition. For example, it might be determined that a user needs to be notified of the low product condition when the amount of product 14 remaining within container 12 is about 10% of the total amount container 12 will hold. Alternatively, it may be desired to make the set point wherein the biasing device 28 will move the container holder 22 upward in order to indicate the low product condition based on an absolute amount of product 14 remaining within container 12, for example 300 grams of a cleaning concentrate.

Once the amount of product 14 remaining within the container 12 reaches the predetermined low level amount, the weight of the container holder 22 pressing against the biasing device 28 will be light enough that the biasing device 28 will cause the container holder 22 to move upwardly as shown in FIG. 1C. The upward movement of the container holder 22 causes a corresponding upward movement of the sign 24, relative to the fixed indicator 26. A user will be able to perceive that the relative position of the sign 24 compared to the indicator 26 has changed such that the indicator 26 is now aligned with a portion of the sign 24 that indicates a low level of product 14 remaining within the container 12. The indicator 26 might be a pointer, a notch, or a line adjacent to the sign 24, or could be a window that displays only a portion of the sign 24. As more and more product is removed from the container 12, the sign 24 will be moved higher and higher causing the indicator 26 to be aligned with and indicate a lower portion of the sign 24 as an indication of the amount of product 14 remaining within the container 12. Therefore, the sign 24 may be marked with gradations to indicate how close to empty the container 12 is. According to one embodiment, a top half of the sign 24 will be a first color, for example green, and bottom half of the sign will be a second color, for example red. If the indicator 26 is aligned with only the green portion of the sign 24, that would be an indication that the container is not at a low level. As indicator 26 moves farther and farther into the red section of the sign 24, that is an indicator that the amount of the product is low, and getting closer to being empty. When the container 12 is empty, or nearly empty as shown in FIG. 1D, the container holder 22 will be at the top of its movement range, and the indicator 26 will be aligned with the top portion of the sign 24 to indicate that the product 14 has been completely exhausted from the container 12.

The housing 16 may be portable, or may be a more permanent structure. The housing 16 may include covers and doors to protect and hide from view the components of the dispenser 10. The housing may be free standing or may be designed to be mounted on a wall.

An alternative embodiment of the present invention is shown in FIGS. 2A-2D. The dispenser 100 has a housing 102 that generally contains and supports the dispensing components. A product container 104 contains a consumable product 106. Dispensing apparatus 108 interacts with the container 104 to selectively withdraw and dispense a consumable product 106 from the container 104. The dispensing apparatus 108 might include such things as an inlet tube for withdrawing product 106 out of the container 104, an outlet for dispensing the product, controls for controlling the dispensing process, an inlet for receiving a diluent to mix with the product 106 in order to create a mixture, the manifold for combining the diluent and the product 106, a pump or pumps for moving, combining, and expelling the diluent and product 106, and other standard dispensing equipment. The dispensing apparatus 108 is shown as a black box in FIG. 2A, however those of skill in the art will be aware of various equipment that can serve as the dispensing apparatus 108.

Figure 2A:
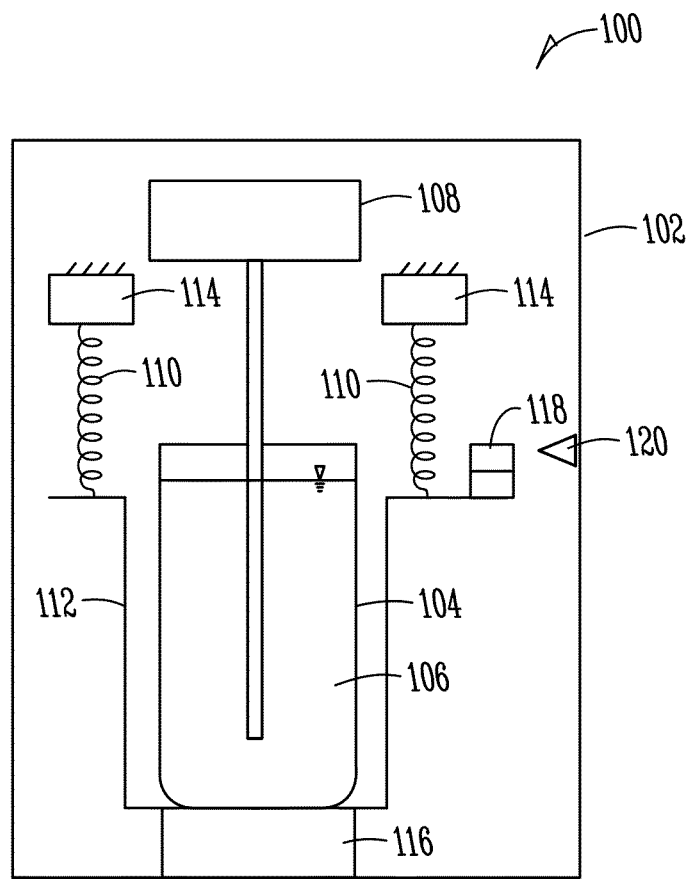
FIG. 2A is a front elevation view of a dispenser according to another embodiment of the present invention, wherein a low product indicator utilizes extension springs, and wherein the container is nearly full.

The dispenser 100 of FIGS. 2A-2D includes a low product level indicator arrangement that utilizes extension springs 110. The container 104 is support by a container holder 112. The container holder 112 is in turn supported within the housing 102 by the extension springs 110. The extension springs 110 hang from support brackets 114 that are fixed to the housing 102. Therefore, the container holder 112 will have a vertical range of movement within the housing 102 depending upon how much the extension springs 110 are extended. At the bottom of the movement range, a support 116 may be provided to carry a portion of the weight of the container holder 112, so that the springs 110 do not bear the entire weight of the container holder 112 when the container 104 contains a high level of product 106, as shown in FIG. 2A. A sign 118 is connected to the container holder 112 move up and down with the container holder 112. An indicator 120 that is vertically fixed relative to the housing 102 is provided in close proximity to the sign 118. Accordingly, as the sign 118 moves up and down with the container holder 112, the indicator will be aligned with a different portion of the sign 118. The sign 118 will include visual indicia that correspond with how much product 106 remains within the container 104. Accordingly, a marking or other visual indication at an upper portion of sign 118 will correspond with the product level within the container 104 not being low; whereas, a marking or visual indicator at a lower portion of the sign 118 will correspond with the product level within the container 104 being low.

In FIG. 2A the product level within the container 104 is nearly at the top of the container of 104. Accordingly the weight of the container 104 and container holder 112 pulling against the extension springs 110 moves the container holder 112 all the way to the bottom of its range of movement such that it is contact with and partially support by the support 116. The indicator 120 aligns with the upper portion of the sign 118 to give a visual cue to a user that the amount of product 106 remaining within the container 104 is not low, and the user is not in jeopardy of running out of product 106.

Figure 2B:
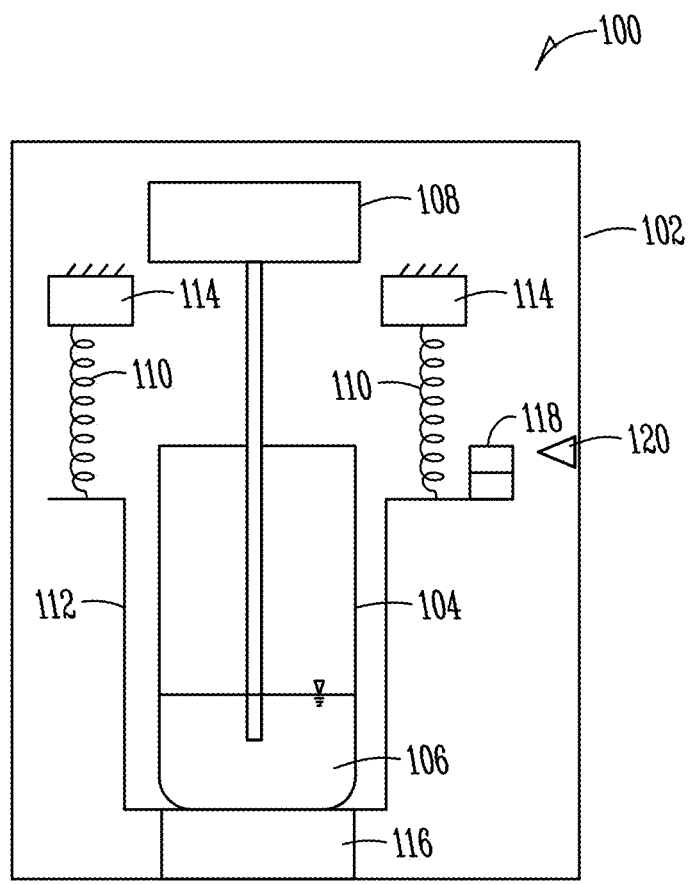
FIG. 2B shows the product dispenser of FIG. 2A, wherein the product remaining in the container is nearly at a low level.

FIG. 2B shows the dispenser 100 of FIG. 2A wherein most of the product 106 has been consumed out of container 104. The product level within the container 104 is at a preselected level wherein the low indicator will begin to give an indication that the product level is starting to get low. Therefore, in FIG. 2B, the container holder 112 is still at the bottom of its movement range in contact with, but not putting any weight against, support 116. In other words, the extension springs 110 are providing a biasing force that is equal to the weight of the container holder 112 with the container 104 but have not yet moved the container holder 112 upwardly off of the support 116. Accordingly, the indicator 120 is still aligned with a top portion of the sign 118 such that a user still sees the status of the container 104 as not being low. If any additional product 106 is removed from the container 104 shown in FIG. 2B, the container holder 112 will be moved upwardly by the biasing force of springs 110, such that a low product indication will be given by the indicator 120 on the sign 118.

Figure 2C:
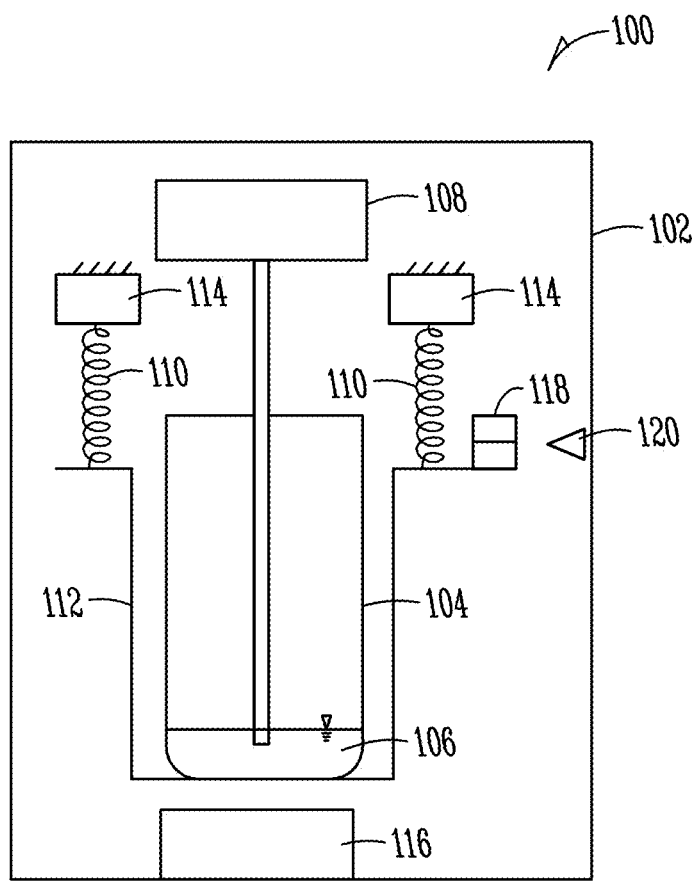
FIG. 2C shows the product dispenser of FIG. 2B, wherein the product remaining in the container is at a low level.

FIG. 2C shows the dispenser 100 of FIG. 2B, wherein additional product 106 has been dispensed, such that only a low level of product 106 remains within the container 104. Because the container 104 contains a lower amount of product 106, the mass of the product 106 remaining within the container 104 is less, and therefore the weight supported by the container holder 112 is corresponding lower. The biasing full force of the springs 110 is sufficient to lift container holder 112 upwardly off the support 116. The upward movement of the container holder 112 causes the sign 118 to also move upwardly, and therefore the indicator 120 aligns with a central portion of the sign 118. This alignment of the indicator 120 with the sign 118 provides a visual cue to a user that the product level within the container 104 is low. Accordingly a user can be put on alert that very soon the user will need to either replace or refill the container 104.

Figure 2D:
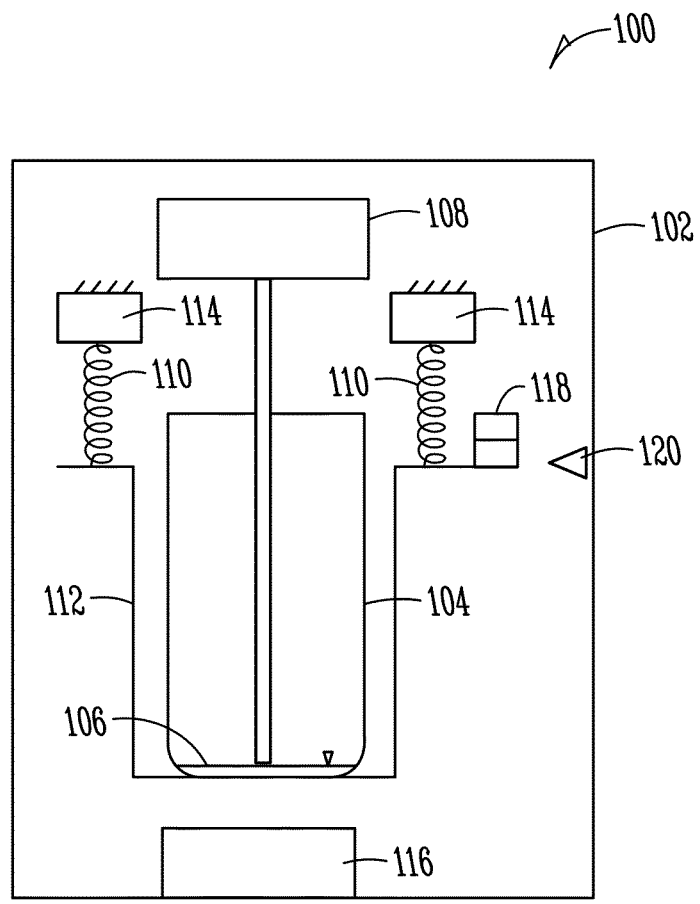
FIG. 2D shows the product dispenser of FIG. 2C, wherein the container is empty.

FIG. 2D shows the dispenser 100 of FIG. 2C, wherein additional product 106 has been dispensed from the container 104, such that the container 104 is very nearly empty. The mass of the product 106 within the container 104 is negligible, therefore the weight supported by the container holder 112 represents only the weight of the container 104. The extension springs 110 therefore raise the container holder 112 to the upper portion of the movement range for the container holder 112. The sign 118 is therefore moved to an even higher height, such that the indicator 120 aligns with a bottom portion of the sign 118. This provides a visual indicator that the container 104 is empty, and the user must either replace or refill the container 104.

Figure 3:
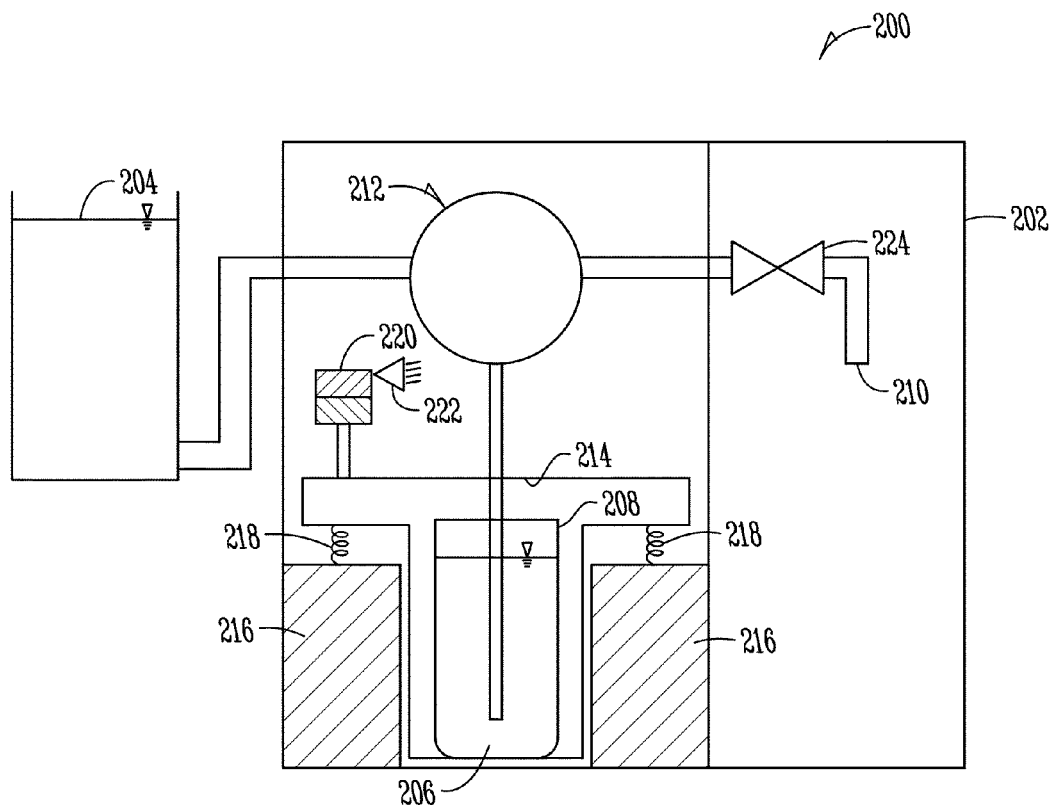
FIG. 3 shows a dispenser according to another embodiment of the present invention, wherein compression springs interact with a container holder and guides for the container holder as part of a low product indicator, and wherein the consumable container is nearly full.

FIG. 3 shows another embodiment of the dispenser 200 according to the present invention, wherein the biasing member 218 is disposed between a container holder 214 and a container holder guide 216 as part of a low indicator assembly. More specifically, as seen in FIG. 3, the dispenser 200 includes an outer housing 202. A product 206 is stored within a product container 208. The housing 202 may be a cabinet or similar device, or may be a more portable structure. The product 206 may be a product that is dispensed, such as a detergent, sanitizer, or other consumable product. The housing 202 may be connected with an external diluent source 204, such as an external water supply. In operation, the product 206 may be mixed with the diluent 204 to create a desired solution that gets dispensed at outlet 210. A control 224 may be provided to permit a user to control a dispensing operation. The mixing of the diluent 204 with the consumable product 206, as well as the movement of the solution within the dispenser 200 to the outlet 210 may be accomplished by manifold assembly 212. The manifold assembly 212 may include tubing, pumps, valves, mixing chambers, and other known components used to mix and transfer liquid solutions.

The housing 202 is provided with guides 216 that interact with a container holder 218 to retain the container holder 214 within the housing 202, such that the container holder 214 has a vertical range of movement. A biasing device, or biasing devices, such as compression springs 218 are provided between the guide 216 and a bearing surface on the container holder 214. A sign 220 is fixed to the container holder 214 to move up and down with the container holder 214. An indicator 222 is vertically fixed with respect to the housing 202 at a location near the sign 220, such that the indicator 222 indicates a different portion of the sign 220 depending upon the vertical location of the sign 220. The indicator 222 may be a pointer, a notch, or could be an opening or transparent portion of a cover or door of the housing 202 that aligns with the sign 220. Sign 220 may include different markings or other visual indicia at an upper portion of the sign as compared to a lower portion of the sign 220. Accordingly when the indicator 222 aligns with a top portion of the sign 220 a user will see that as an indication that the container 208 is not running low on product 206. Conversely, if the indicator 222 is aligned with a lower portion of the sign 220 that will be seen by a user as indicating that the container 208 is running low on product 206. As shown in FIG. 3, the compression springs 218 are fully compressed such that the container holder 14 is at the bottom most of its movement range because of the container 208 has a relatively high level of product 206 remaining. While not shown in the figures, it should be appreciated that as the product 206 is consumed from the container 208 by being dispensed, the level of product 206 remaining within the container will drop, causing a corresponding drop in the mass of product 206 remaining. Once the product 206 reaches a low level within the container 208 the biasing force of the springs 218 will begin to move the container holder 214 upwardly, causing a corresponding upward movement of the sign 220. Accordingly, the indicator 222 will be aligned with an intermediate portion of the sign 220, giving a user notice that the product 206 is at a low level within the container 208, such that the user should have a replacement container or refill product on hand. Eventually, as the product 206 is completely depleted from the container 208 the springs 218 will lift the container holder 214 to the upper extreme of its movement range, at which point the indicator 222 will be aligned with a bottom portion of the sign 220 to indicate that the container 208 is out of product.

FIGS. 4-13 show a dispenser 300 according to a preferred embodiment of the present invention. The dispenser 300 is especially well suited for dispensing a cleaning and sanitizing product, for example a peroxyacietic acid and hydrogen peroxide solution. In particularly, the dispenser 300 can dispense a diluted solution to either a bottle container or a bucket. The peroxyacietic acid and hydrogen peroxide mixture comes in a concentrated form that represents a consumable product that typically is contained within a disposable opaque 3-liter container.

Figure 4:
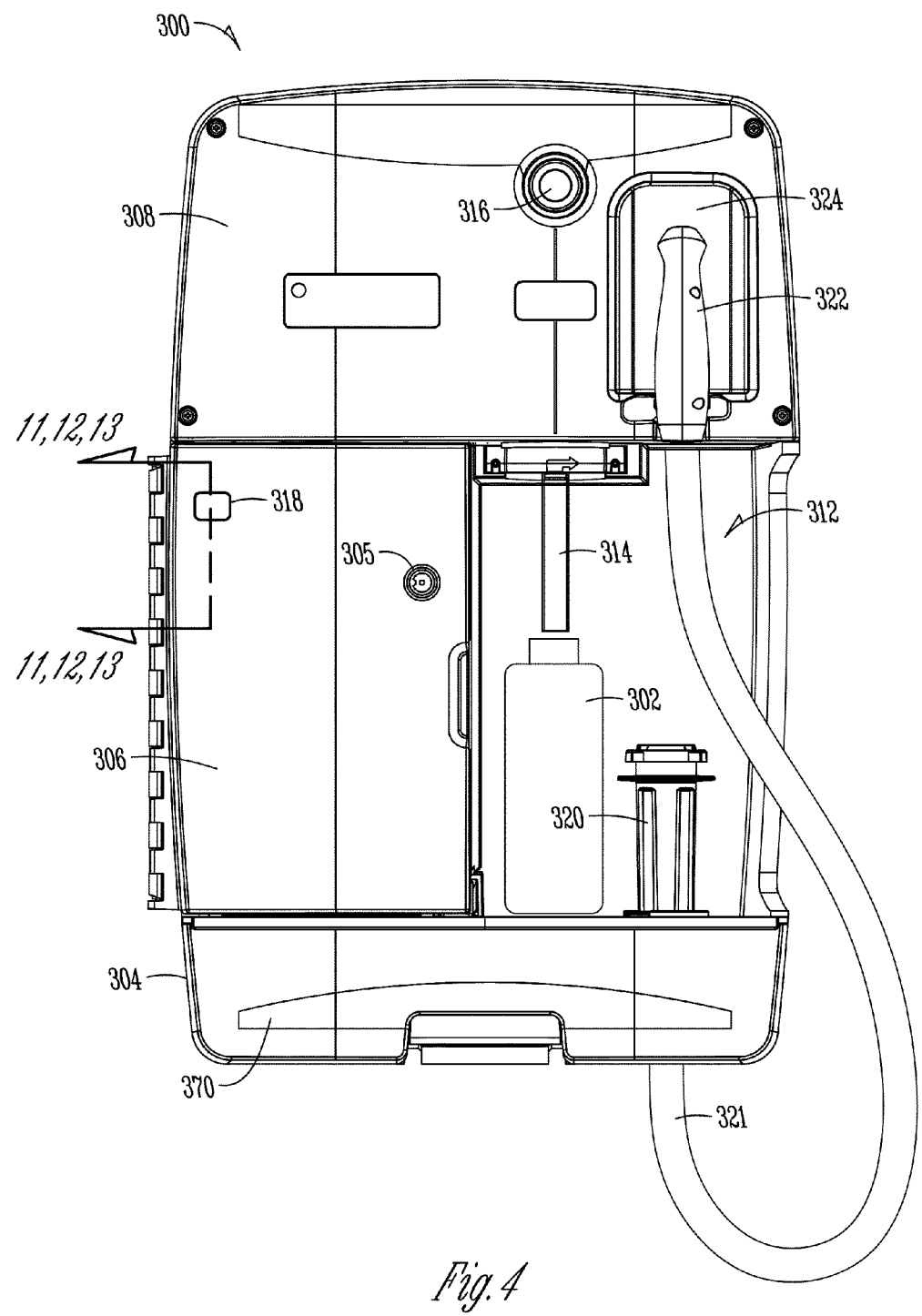
FIG. 4 is a front elevation view of a dispenser according to another embodiment of the present invention showing the dispenser being used to fill a bottle.

FIG. 4 shows a front elevation view of the dispenser 300 configured to dispense the solution to a portable bottle 302. The dispenser 300 includes a cabinet structure 304. The cabinet 304 is intended to be mounted on a wall. The cabinet structure 304 has a door 306 including a lock 305 as well as a top front cover 308. In general, the door 306 selectively opens and closes to a consumable product storage area (not shown in FIG. 4, see area 310 in FIG. 6). The top cover 308 encloses and protects the manifold assembly (see FIG. 8). The front of the cabinet 304 includes an open recessed dispensing area 312 and an outlet tube 314 that extends downwardly from the manifold assembly to provide an outlet for the solution to be dispensed. A control 316, such as a button, can be used to activate and deactivate the dispensing of the solution. Therefore, in order to fill a bottle 302 with a solution, a user would align the bottle 302 underneath the outlet tube 314 and press the button 316 to dispense the solution into the bottle 302. Once a desired amount of solution has been dispensed in the bottle 302 the control button 316 may be released to stop the dispensing process. Other types of control for dispensing process will be well known to those skilled in the art. An indicator window 318 is provided on the door 306. A visual inspection of the indicator window 318 will indicate to a user whether the amount of consumable product remaining is running low, such that a replacement container or refill of the product needs to be readily at hand.

Figure 5:
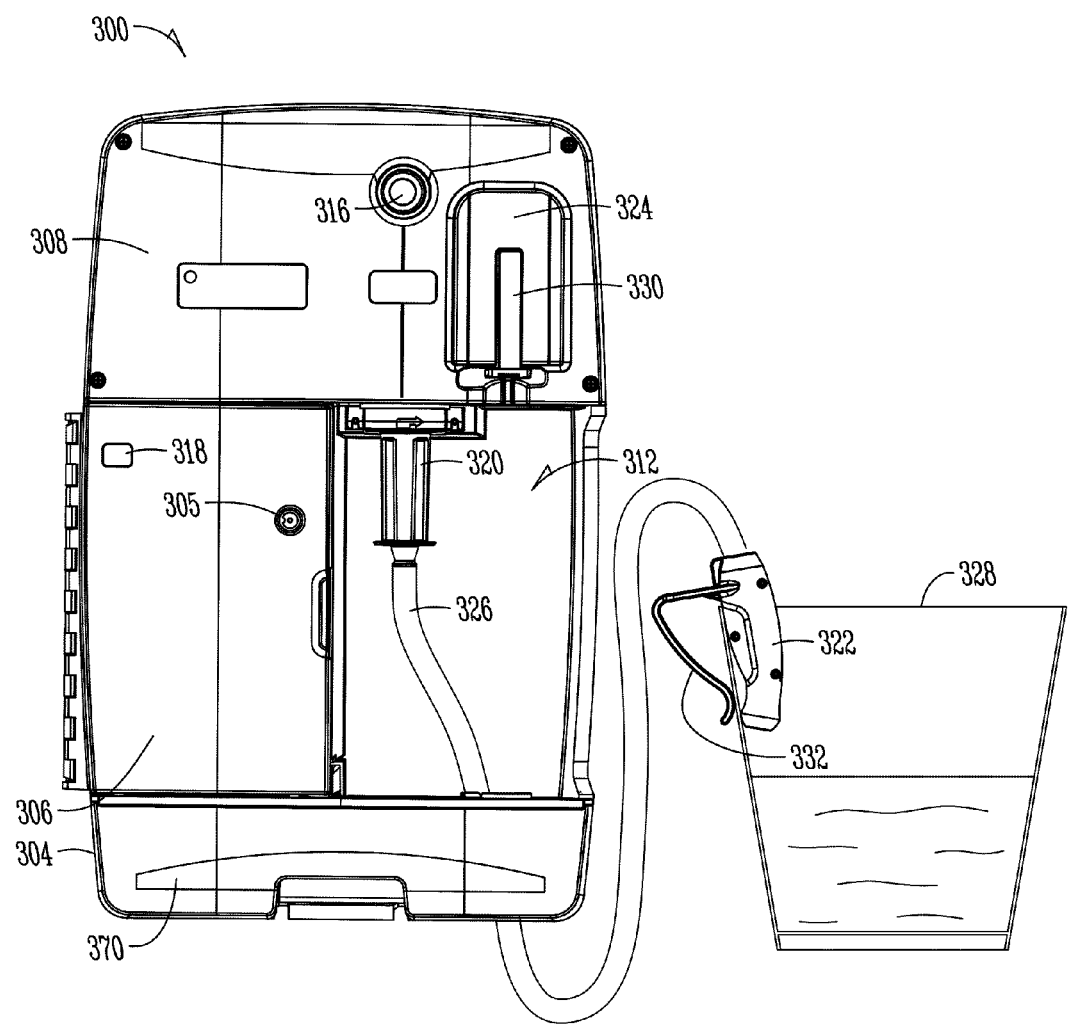
FIG. 5 shows the dispenser of FIG. 4, being used to fill a bucket.

A bucket fill adapter 320 may be stored within the dispensing area 312. A bucket dispensing handle 322 is releasably stored within a recess 324 or in the top cover 308. FIG. 5 illustrates use of the dispenser 300 in a bucket filling operation. The bucket fill adapter 320 attaches to an undersurface of the dispensing area 312, such that the adapter 320 covers the outlet tube 314. The bucket fill handle 322 is released from the top cover 308, and in particular from its retaining slot 330 within the recessed area 324. A hose or tube 326 extends from the lower portion of adapter 320, passes through a passage in the lower portion of the cabinet (see description related to FIGS. 14-16 below) and attaches to the bucket fill handle 322. A bucket 328 (shown in cross section in FIG. 5) may be provided in close proximity in the dispenser 300. A retainer clip 332 may be used to connect the bucket fill handle 322 to the bucket 328 as shown in FIG. 5. A user may then dispense solution into the bucket 328 by activating the dispenser 300 using the control button 316. A user may verify whether the amount of product remaining is at low level by visually inspecting window 318 in door 306.

Figure 6:
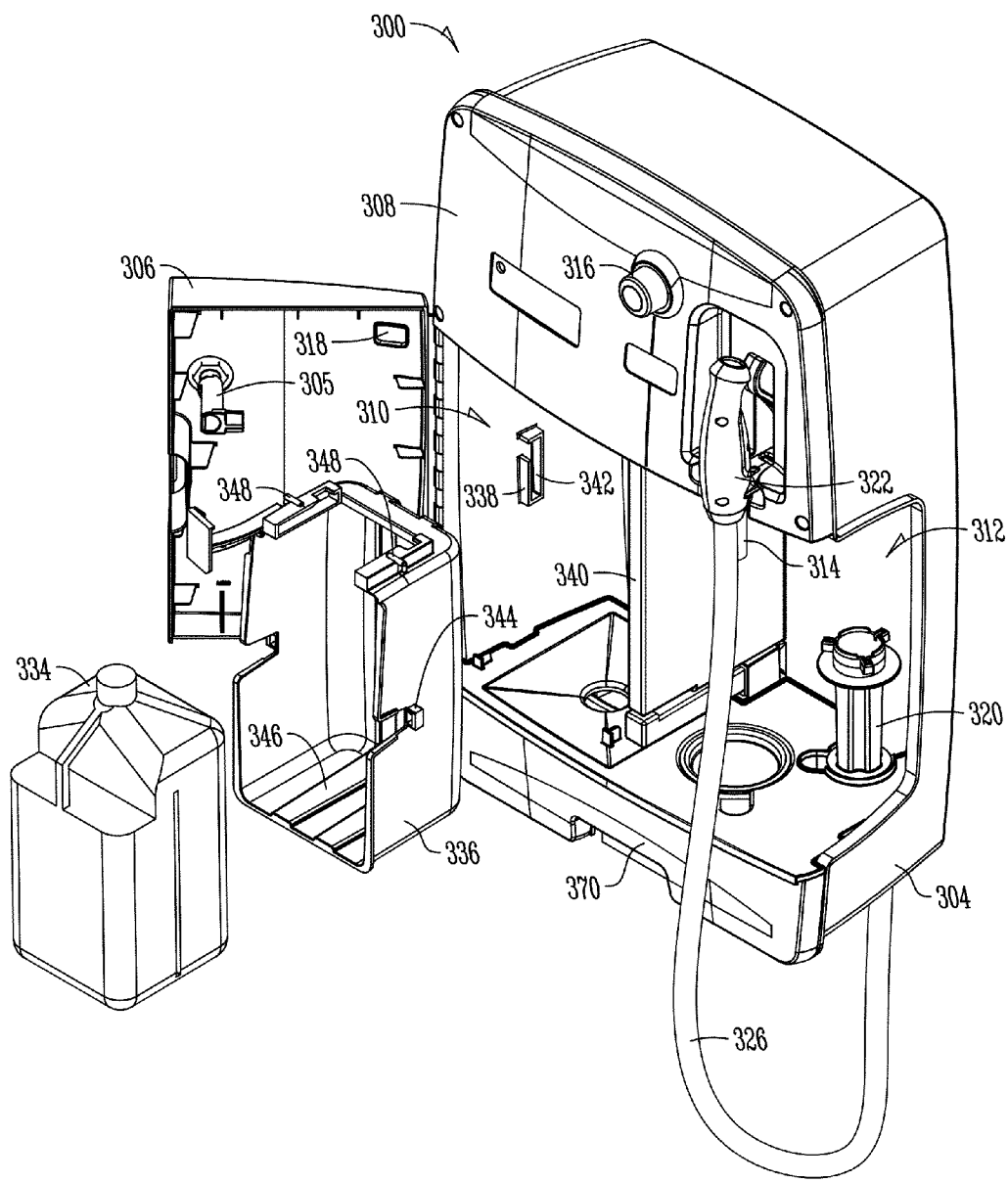
FIG. 6 is an exploded view of the dispenser of FIG. 4, with the dispenser door open, and the product container and product container holder pulled out of the cabinet.

FIG. 6 shows the dispenser 300 of FIG. 4 with the door 306 rotated to an open position and with a product container 334 and a container holder 336 pulled out of the product storage area 310 of the cabinet 304.

A wall 340 separates the product container area 310 from the dispensing area 312. A pair of guides 338 are provided on the inner walls of the product container area 310. The guides 338 each form a channel 342 that is generally vertically oriented. The container holder 336 includes a pair of tabs 344 that can be received within the channels 342 within the guides 338. Once a tab 334 is received within its corresponding channel 342 the container holder 336 will be constrained to a vertical movement range defined by the guides 338. The tabs 344 retained within the channels 342 of the guides 338 will prevent lateral movement of the container holder 336, but will permit a range of vertical movement.

Figure 7:
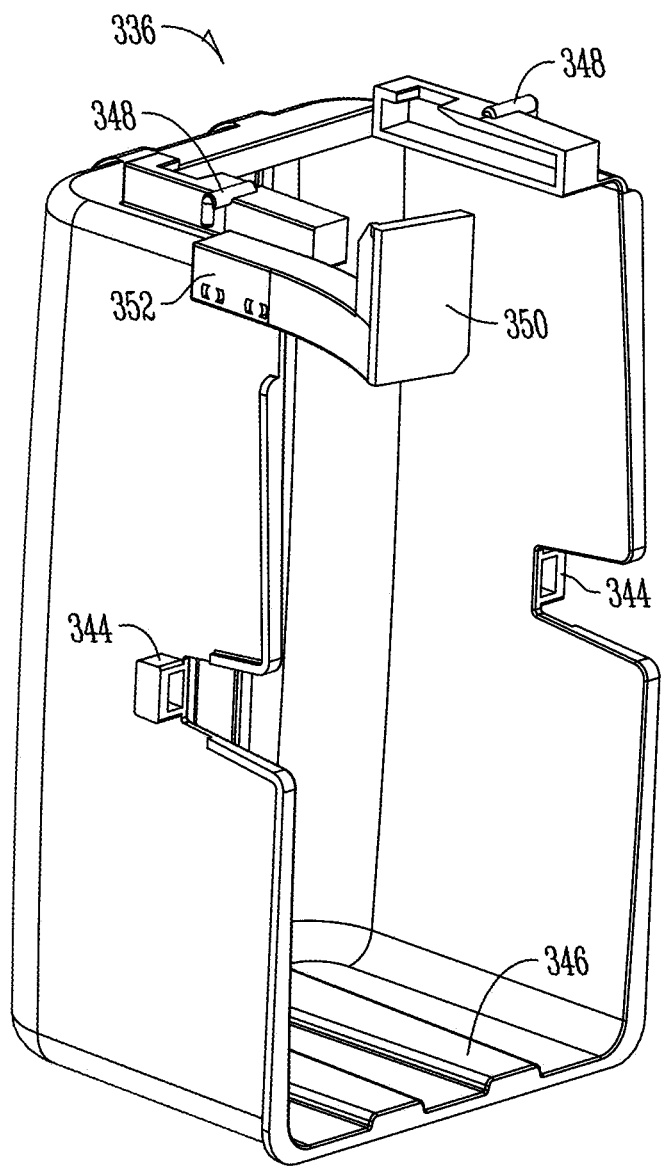
FIG. 7 is an isometric view of the product container holder from the dispenser of FIG. 6.

Details of the container holder 336 can best be seen in isometric detail view of FIG. 7. The container holder 336 may be primarily composed of a single injection molded body. The container holder 336 may include a bottom support surface 346 for supporting the product container 334. In use, the container holder 336 will generally remain within the product container area 310, but may be removed periodically for cleaning of the container holder itself 336, and to permit better access for cleaning of the product container area 310. A pair of hooks 348, or other attachment structures, are provided on the container holder 336. As will be shown and discussed below, these hooks 348 are used to connect the container holder 336 with extension springs. These hooks 348 may be integrally molded with the body of the container holder 336, and should be sufficiently strong to support the weight of the container holder 336 as well as container 334 that is filled to capacity with the consumable product. A sign 350 is attached to the container holder 336. In the embodiment shown the sign 350 extends forwardly from the container holder 336 and is attached by an arm 352. The arm 352 may be connected to a wall of the container holder 336 by threaded fasteners within slots formed in either the arm 352 or the container holder 336, such that some vertical adjustment of the sign 350 is permitted. This vertical adjustment of the sign 350 may be necessary to calibrate or fine tune the location of the sign 350 relative to the container holder 336. As may be appreciated of viewing FIGS. 11-13, the sign 350 is generally in alignment with the window 318 of the door 306, when the container holder 336 is in place within the product container area 310 and the door 306 is closed. The sign 350 may be provided with different markings on its upper portion relative to its lower portion to indicate the product remaining within the product container 334 is at a low level. In particular, if an upper portion of the sign 350 is in alignment with, and therefore visible through, the indicator window 318, that will provide a visual indication to a user that the product remaining within the product container 334 is not at a low level. Conversely, if the markings of the lower portion of the sign 350 are in alignment with, and therefore visible through, the indicator window 381, that will alert a user that the product level remaining within the product container 334 is low.

Figure 8:
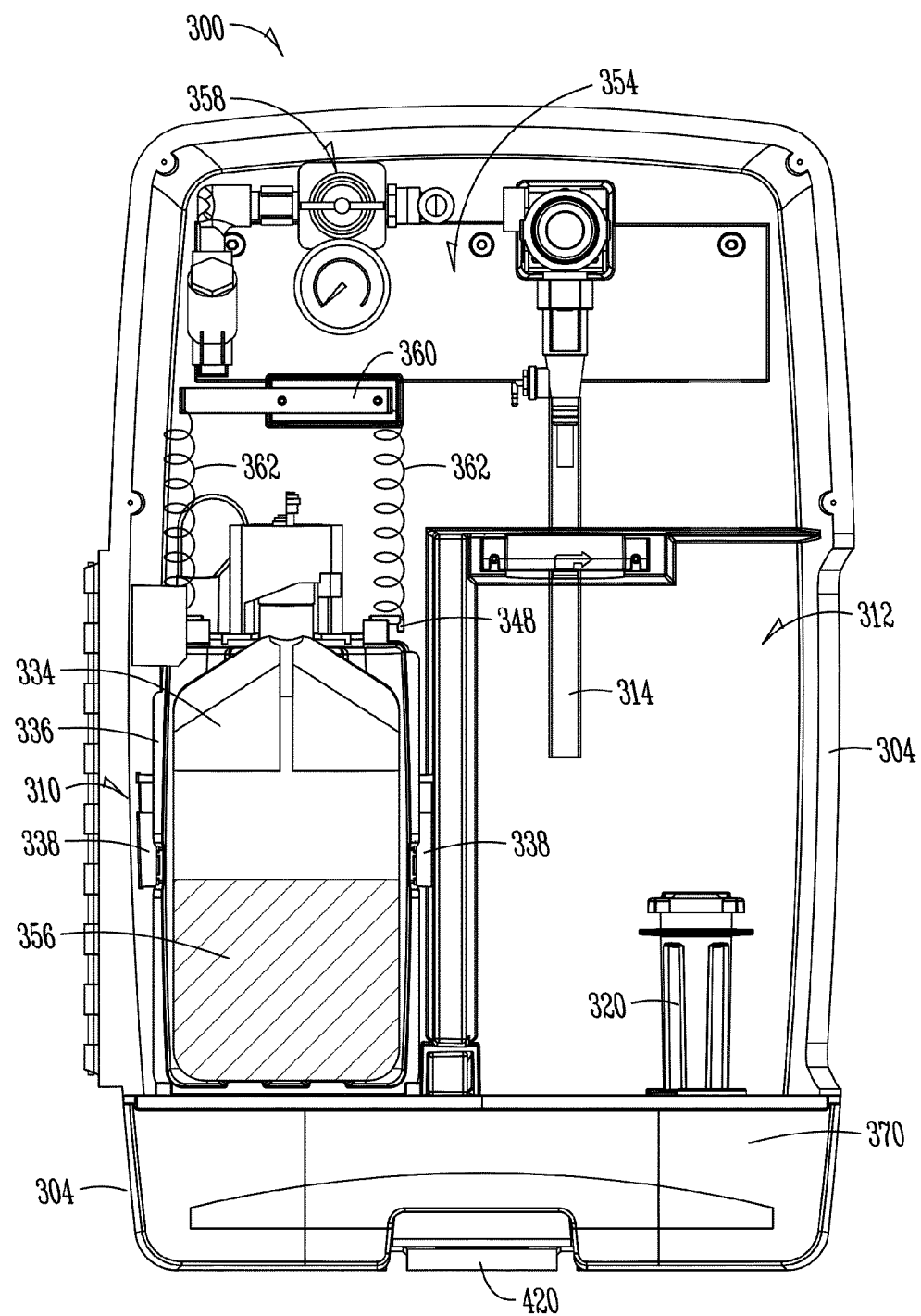
FIG. 8 is a front elevation view of the dispenser of FIG. 4 with the cabinet door and front cover removed, and with the product container about half full of product.
Figure 9:
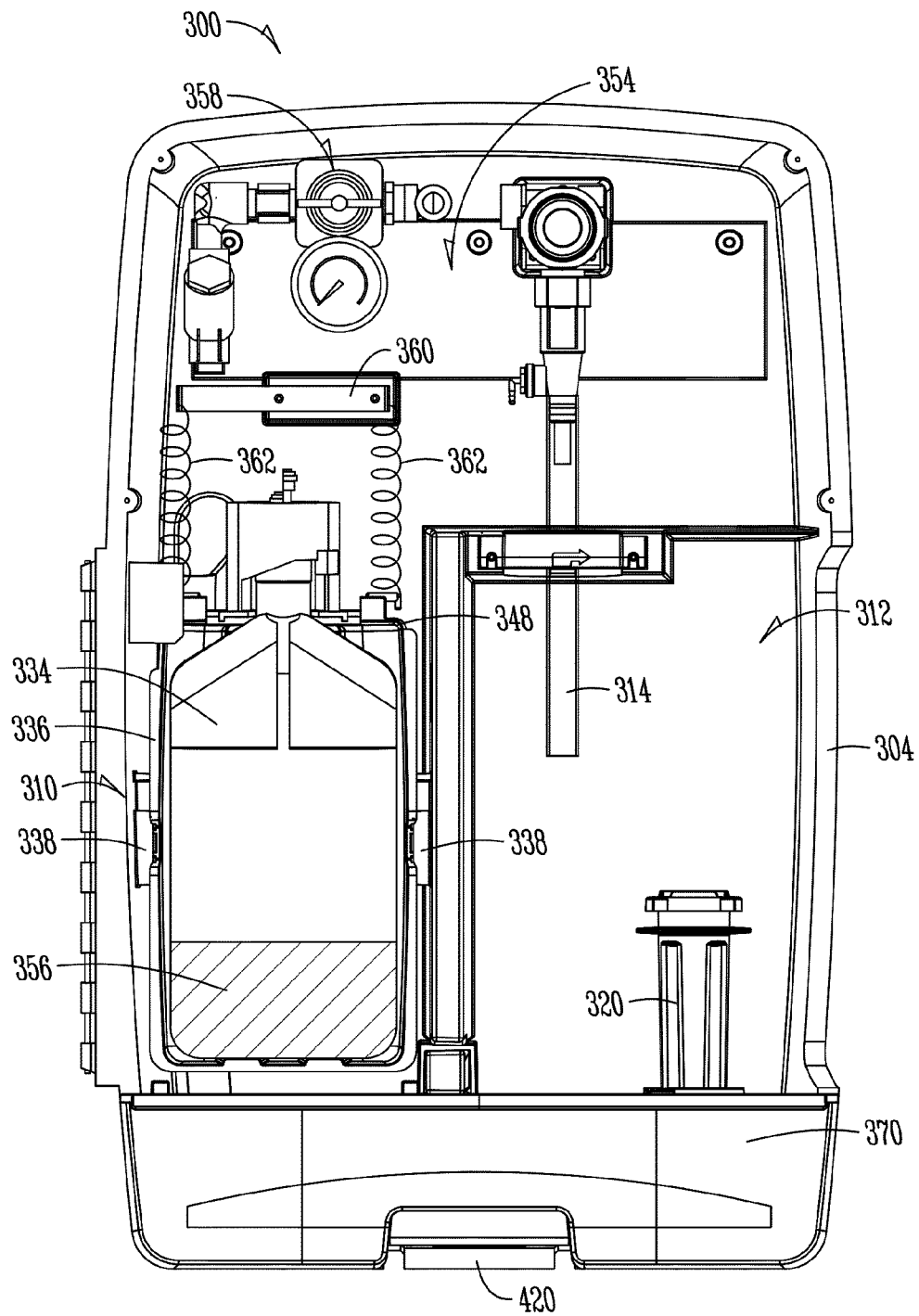
FIG. 9 is a front elevation view of the dispenser of FIG. 8, wherein the product container has a low level of product remaining.
Figure 10:
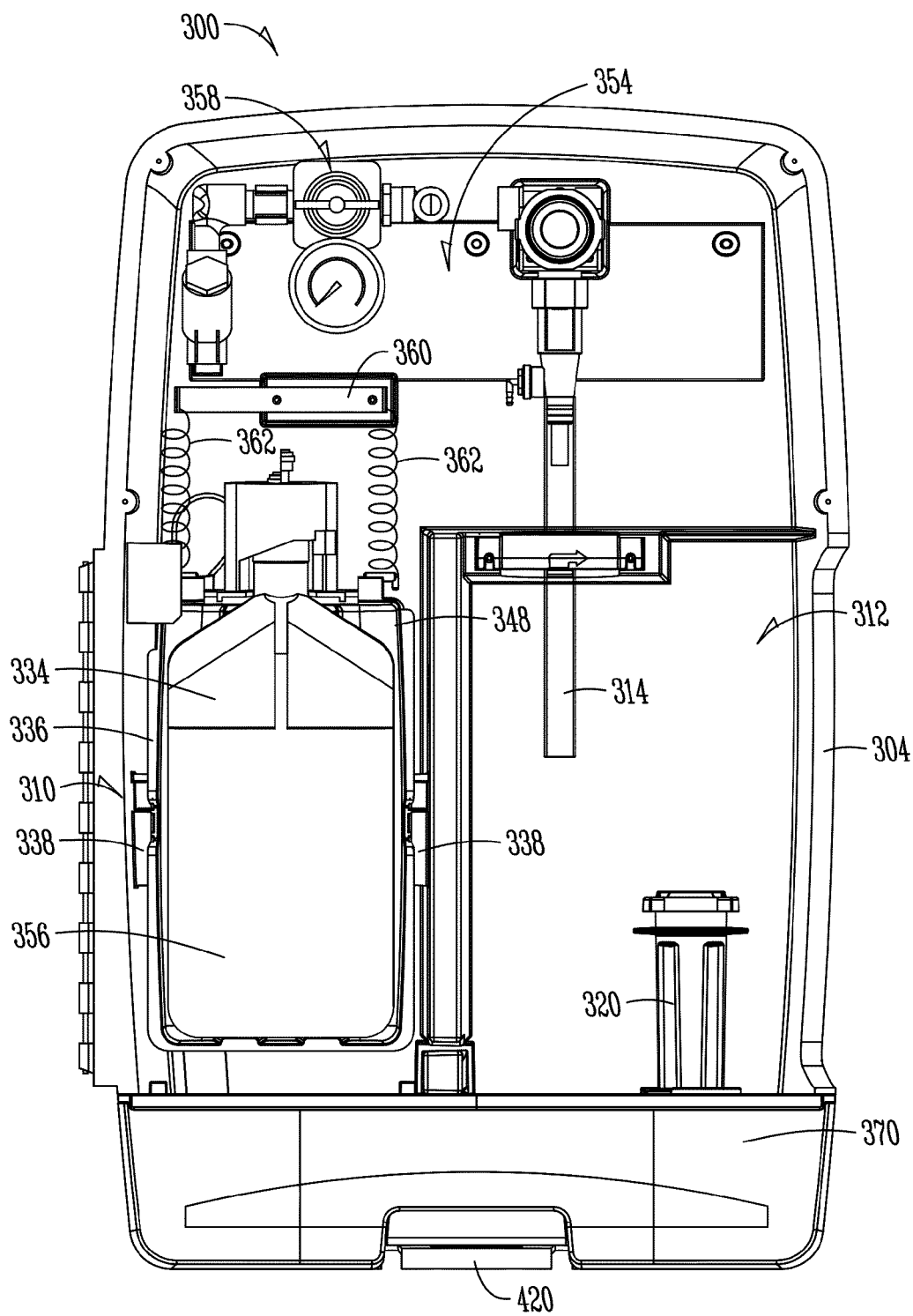
FIG. 10 is a front elevation view of the dispenser of FIG. 9, wherein the product container is nearly empty.
Figure 11:
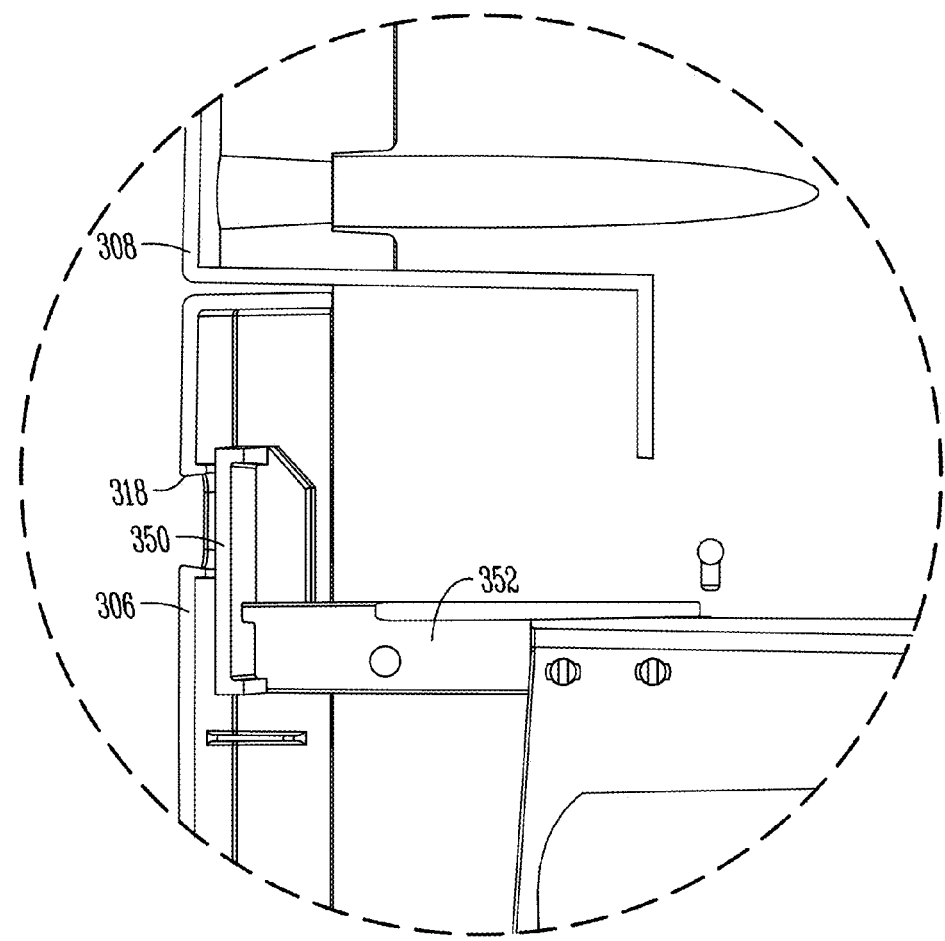
FIG. 11 is a partial cross-sectional view of the cabinet door of the dispenser of FIG. 4, when the product container is nearly full.

FIGS. 8-10 show the dispenser 300 with the door 306 and top cover 308 removed to reveal the manifold area 354 in the product container area 310. In FIGS. 8 and 11, the product container 334 contains enough product 356 that the product level is not considered to be low, and the container 334 is not in jeopardy of running out of product 356. An assembly for mixing the product 356 with water and dispensing the resulting mixture through the outlet tube 314 is generally indicated at 358. The details of this assembly 358 are not critical to the low product level indicator of the present invention, and are not discussed in detailed herein. A suitable system for handling a product, water, and mixture is shown in U.S. Provisional Patent Application Ser. No. 61/734,532 filed Dec. 7, 2012, which is hereby incorporated by reference in its entirety. Those of skill in the art will be aware of other suitable systems.

A bracket 360 is mounted within the cabinet 304, for example within the manifold area 354. According to the embodiment shown, the bracket 360 is generally U-shaped and is made from a hard material such as metal. The U-shaped bracket 360 has a base portion fixed to a support surface of the cabinet 304. Legs extend outwardly from opposite ends of the base portion of the U-shaped bracket 360. Each of the legs of the bracket 360 includes an opening or hook (not shown) for attaching a pair of extension springs 362. The extension springs 362 act as a biasing device that tends to urge the container holder 336 upwardly towards the upper most limit of its movement range by pulling against hooks 348 on the container holder 336. The springs 362 may be selected at an appropriate length and spring constant such that they will begin to lift the container holder 336 and container 334 from the lower most extreme of the movement range when the amount of product 356 remaining in the container 334 reaches a predetermined low level. For example, for a 3-liter bottle, the low level may be selected as 300 grams (about 300 ml) of product 356 remaining.

Because the amount of product 356 remaining within the product container 334 of FIG. 8 is not yet at a low level (e.g., more than 300 grams for a 3-liter bottle), the weight supported by the container holder 336 is sufficient to fully extend the extension springs 362 such that the container holder 336 is at the lower most reach of its movement range, with the container holder 336 being partially supported by a lower surface of the cabinet 304 within the storage area 310. As seen in FIG. 11, when the product container holder 336 is at the bottom of its movement range, the upper portion of the sign 350 is in alignment with the indicator window 318 in the door 306. Therefore a user viewing the indicator window 318 will see the upper portion of the sign 350 and realize that the container 334 contains more than a low level of product 356.

Figure 12:
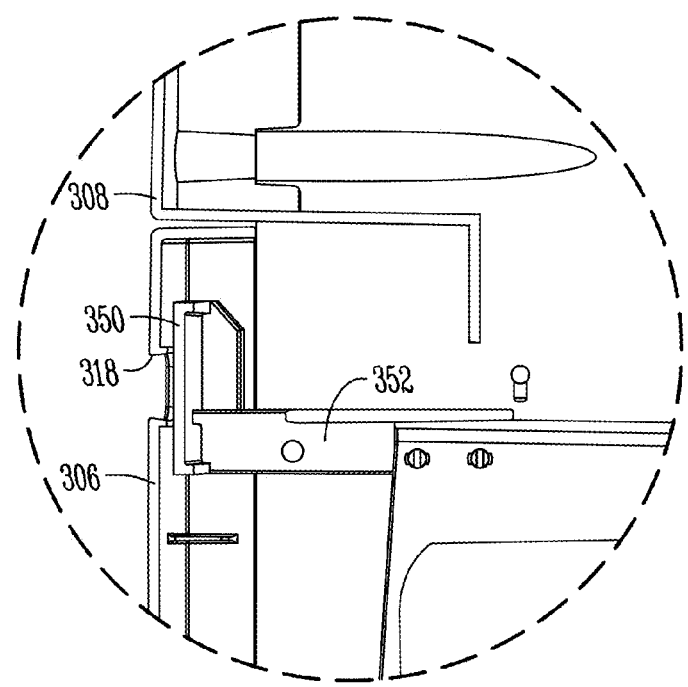
FIG. 12 is a partial cross-sectional view of the cabinet door of the dispenser of FIG. 4, when the product container contains a low level of product.

FIGS. 9 and 12 show the dispenser 300 of FIGS. 8 and 11, wherein an additional amount of the product 356 has been dispensed out of the container 334 such that the product level is now considered to be at a low level (e.g., less than 300 grams remaining in a 3-liter bottle). Accordingly, the weight supported by the container holder 336 is reduced, and the extension springs 362 exert enough force to lift the container holder 336 a small amount off the bottom surface of the storage area 310. Accordingly, as seen in FIG. 12, a central portion of the sign 350 is in alignment with the indicator window of the door 306. Accordingly, a user looking at the indicator window 318 will see a central portion of the sign 350, which will give the user an indication that the amount of product 356 remaining within the product container 334 is at a low level. The user will therefore be aware that the user should have another container 334 or a refill supply of product 356. According to one embodiment, the lower portion of the sign 350 will be green and a bottom portion will be red. Accordingly if a user sees only the green portion of the sign 350 when looking through the window 318 the user will understand that the product level is not yet low. On the other hand, if a user sees both green and red when looking through the window 318, a user will know the product level is getting low. Finally, if a user looking at the window 318 sees only the lower portion, or the red color portion, the user will know the container 334 is empty or very nearly empty.

Figure 13:
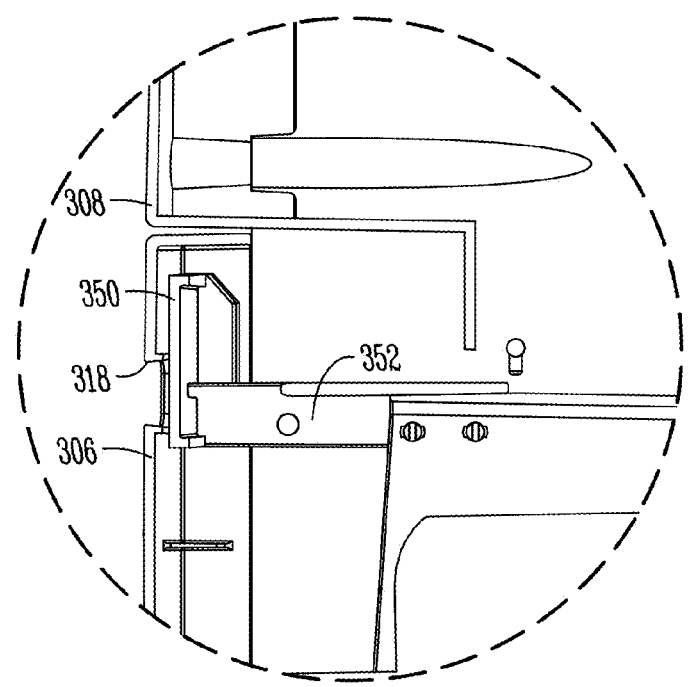
FIG. 13 is a partial cross-sectional view of the door of the dispenser of FIG. 4, when the product container is empty.

FIGS. 10 and 13 illustrate a situation where the product container 334 has completely, or nearly completely, exhausted its supply of product 356. Due to the reduced weight supported by the container holder 336, the springs 362 lift the container holder 336 to the top of its movement range. Accordingly, as seen in FIG. 13, the lower portion of the sign 350 will be aligned with indicator window 318. A user looking through indicator window 318 will see only the bottom portion of the sign 350 and will realize that the container 334 is empty or very nearly empty, such that the product container should be replaced or refilled immediately.

According to another feature of the present invention, a dispenser may include a secondary container that collects any concentrated product spilled from a product container, such that the spilled concentrated product is retained within the dispenser until the secondary container can be removed from the dispenser housing to permit proper disposal of the spilled product. FIGS. 14-17 and 18-20 relate to two different embodiments of dispensers that include removable secondary containers.

Figure 14:
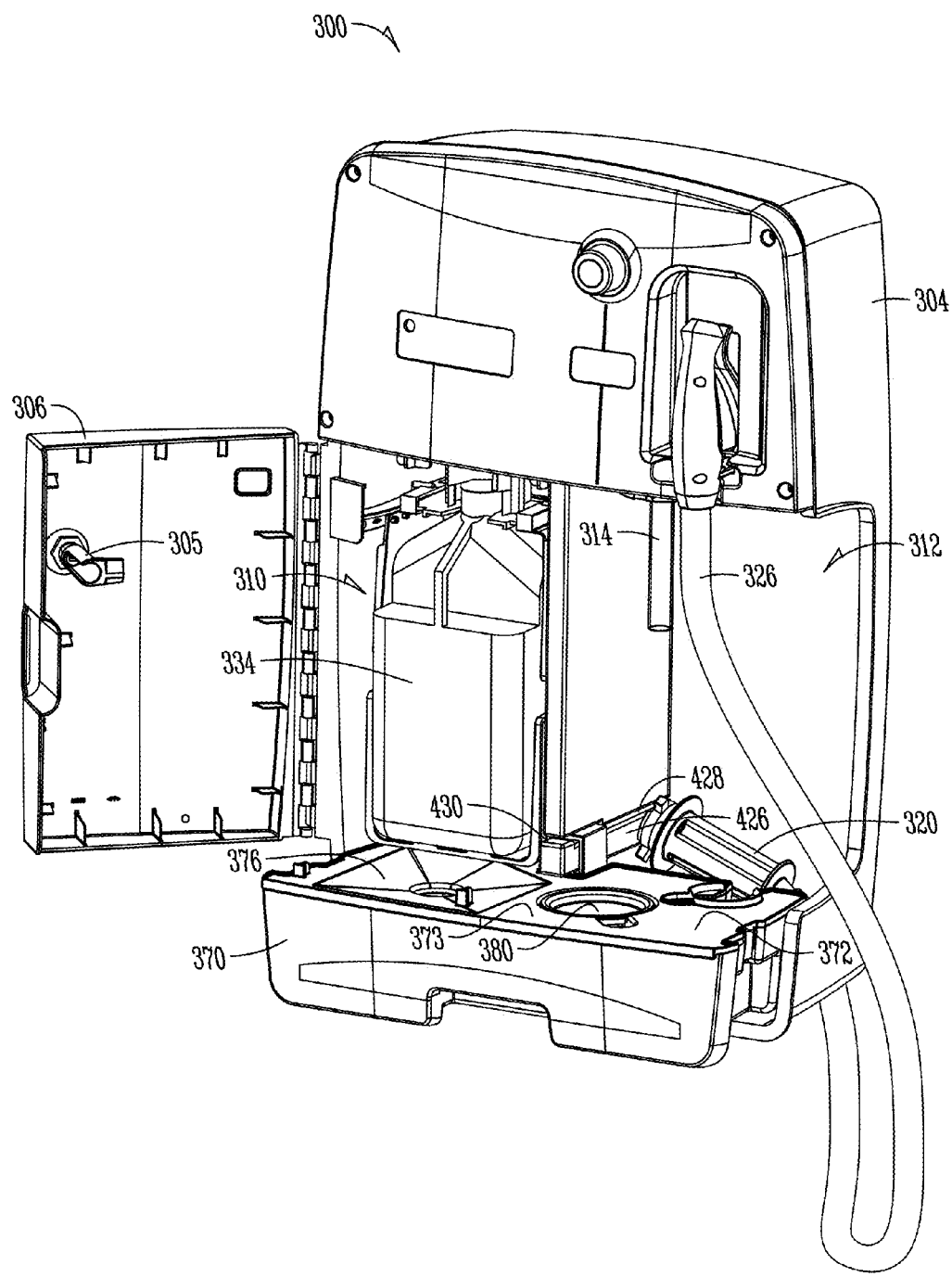
FIG. 14 is an isometric view of the dispenser of FIG. 4 wherein a secondary container has been slid forward to a first position partway out of the dispenser housing.

FIG. 14 shows the dispenser 300 of FIG. 4 wherein a secondary container 370 has been partially withdrawn from the cabinet 304. The secondary container 370 has a lid 372 that generally fits within and covers an upward facing opening of the secondary container 370. The lid 372 has an upper surface 373 that acts as a floor of the container compartment 310 and the dispensing area 312 when the secondary container 370 is fully within the cabinet 304 in a standard operating configuration.

Figure 16:
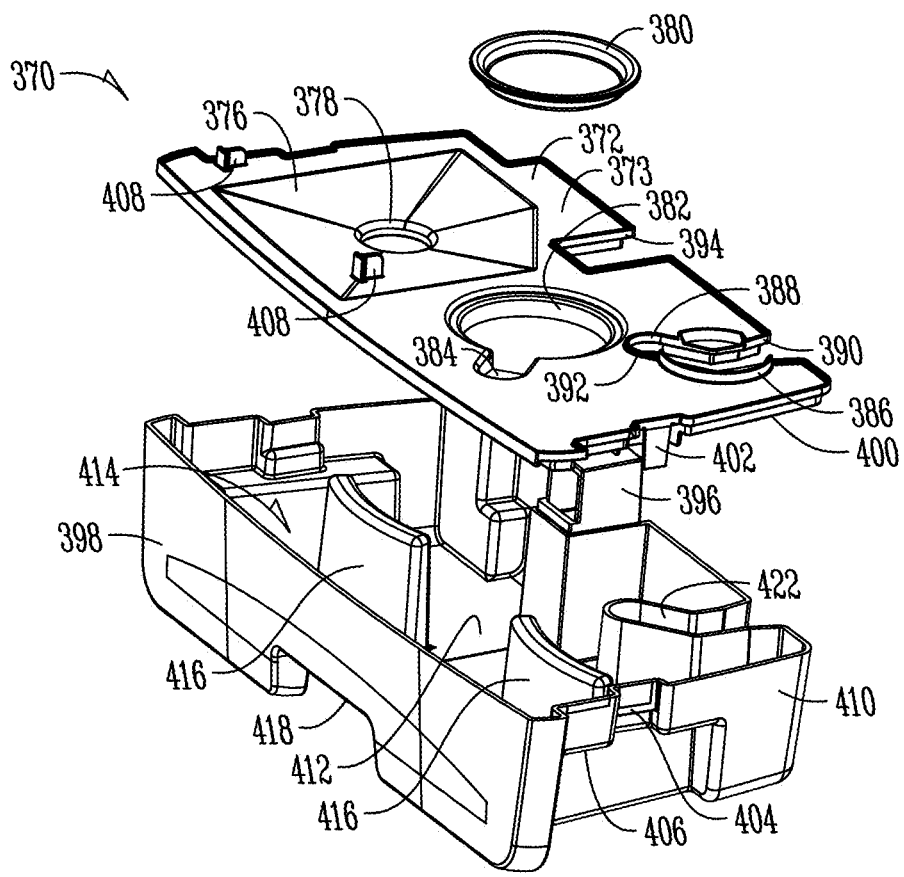
FIG. 16 is an exploded isometric view of the secondary container of FIG. 15 according to one embodiment of the present invention.

As best seen in FIG. 16, the upper surface of the lid 372 includes a sloped surface 376 that guides any spilled product downwardly into the drainage opening 378. The upper surface of the lid 372 also includes a bottle retaining cup 380. The bottle retaining cup 380 generally fits within and covers the bottle opening of 382. The bottle retaining cup 380 preferably has raised sides and a flat central section. The bottle retaining cup 380 is used to provide a resting place for a bottle (see FIG. 4) directly beneath outlet 314 to perform a bottle filling operation. Accordingly, if there are any small spills or splatters of the dispensed solution that drip or fall on or around the bottle, they will be retained within the bottle retaining cup 380. A depression 384 may be provided in the upper surface 373 of the lid 372 along the outer perimeter of the bottle opening 382 to permit a user to get their fingers underneath the top edge of the bottle retaining cup 380 to remove the bottle retaining cup 380 from the opening 382 in order to dispose of any spilled product retained within the bottle retaining cup 380, and to facilitate easy clean-up of the bottle retaining cup 380.

The lid 372 also includes a small raised wall 386 that acts as a support for the bucket fill attachment 320 (see FIG. 6). At the attachment support wall 386 an opening is provided through the lid 372 through which a lower portion of the bucket fill attachment 320 will extend. That opening is provided in the form of a compound slot 388 that includes a first portion 390 at the rear of the lid 372 and a second portion 392 that angles off of the first portion 390. The first portion 390 of the slot 388 is open to the rear of the lid 372. As described below, this rearward opening will allow removal of the lid 372 as part of the secondary container 370 without interference from bucket fill hose 326. The second portion 392 of the slot 388 extends generally towards the center of the bottle retaining cup 382. The second portion 392 of the slot 388 will allow for the bucket fill hose 326 to remain without a kink or obstruction when the bottle fill attachment 320 is attached to the cabinet 304 in a bucket fill configuration (as seen in FIG. 5). The lid 372 also includes a notch 394 along its rear edge. The notch 394 is provided in alignment with a flange 396 that extends upwardly from the lower portion 398 of the secondary container 370. As described in more detail below, the flange 396 engages a guide 426 within the cabinet 304 to limit the range of movement of the secondary container 370 within the cabinet 304.

A downwardly extending lip 400 is provided that it's offset inwardly slightly from the outer perimeter from the lid 372, and generally extends around the entire perimeter of the lid 372. The lip 400 helps to align and retain the lid 372 within the lower portion 398 of the secondary container 370. The lip 400 also serves to seal the interface between the lower portion 398 and the lid 372. The lid 372 is also provided with a pair resilient ears 402 that act as a latch to engage a catch 404 provided at a handle section 406 of the lower portion of 398. To snap the lid 372 in place on the lower portion 398, the lip 400 is aligned generally inside the perimeter of the wall of the lower portion 398, and the user presses downwardly on the lid 372 causing the resilient ears 402 to slide over and snap into place against catches 404. To remove the lid 372 once it is latched in place on the bottom portion 398, the user simply pulls outwardly on the ears 402 causing them flex outwardly, and allowing the user to lift the lid 372 off of the lower portion 398.

Figure 15:
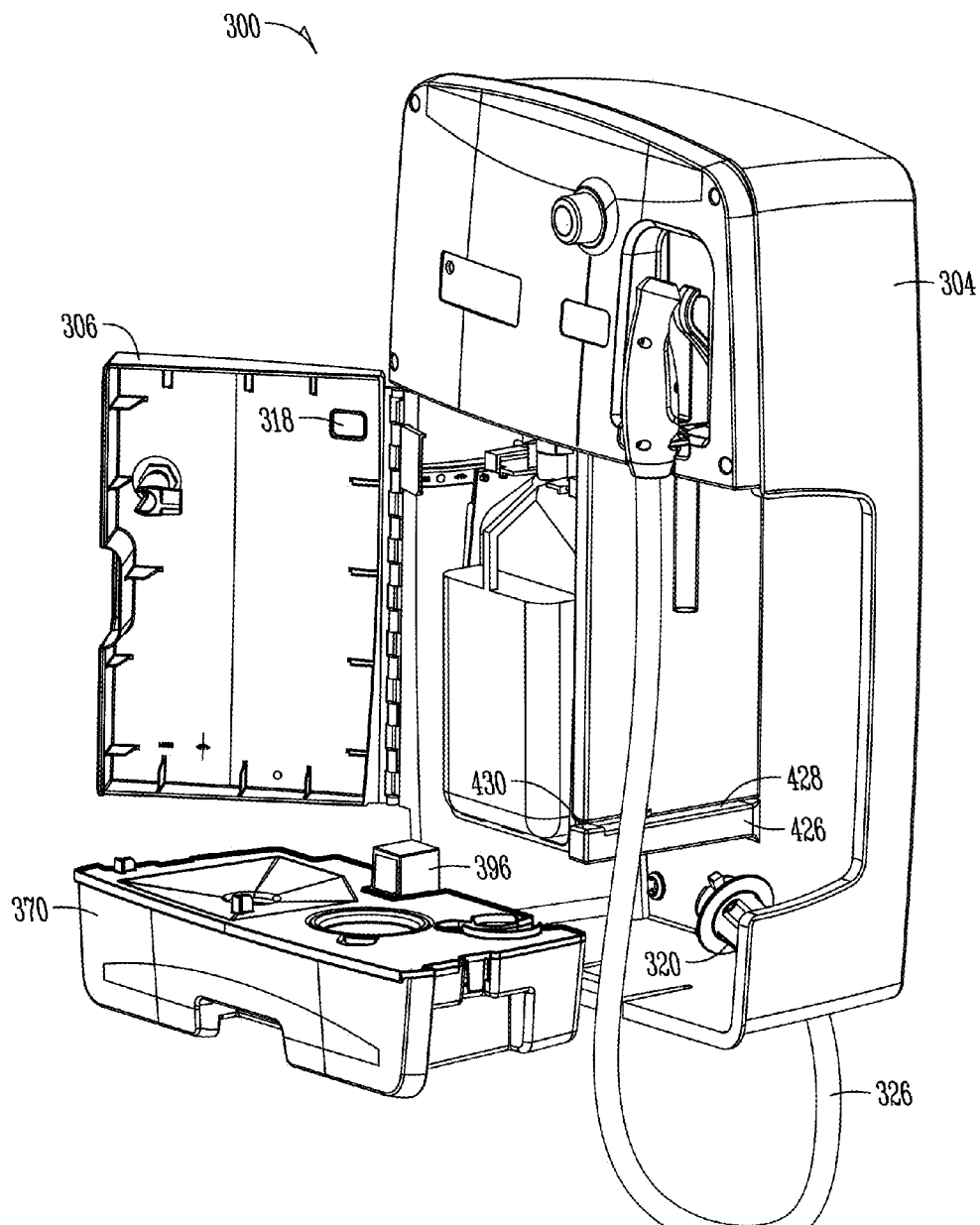
FIG. 15 shows the dispenser of FIG. 14, wherein the secondary container has been lifted above the front step of the guide bar of the housing and slid outward to be completely disconnected from the housing.

The upper surface of the lid 372 also includes a pair tabs 408 that extend upwardly from the upper surface of the lid 372. These tabs 408 extend, or project, upwardly a sufficient distance that if the door 306 is in the closed position (as seen in FIG. 4) a portion of the tabs 408 will be in alignment with the bottom portion of the door 306, such that any attempt to withdraw the container 370 from the cabinet 304 will be prevented by the tabs 408 coming into contact with the inside of the door 306. The entire lid 372 may be a single injection molded piece. Alternatively the tabs 408 may be structures added on by bolting, welding, fasteners or other known attachment mechanisms. When the door 306 is in fully opened position, (as seen in FIGS. 14 and 15) the door 306 is moved out of the way of the tabs 408, and the secondary container 370 may be slid outwardly from the cabinet 304.

The lower portion 398 of the secondary container 370 includes a continuous outer wall 410 that generally extends upwardly around the outer perimeter of a floor 412. The outer wall 410 and floor 412 create a storage reservoir 414. Baffles 416 extend upwardly from the floor 412. The baffles 416 preferably extend upwardly to nearly the same height as the wall 410. The purpose of the baffles 416 is to reduce to the back and forth sloshing of the concentrated product within the secondary container 370 once the secondary container 370 is removed from the cabinet 304 to be emptied and cleaned. In the embodiment shown, two baffles 416 are used. It may be acceptable to use a single baffle, or more than two baffles. The two baffles 416 are aligned primarily to reduce front-to-back sloshing, which is of greatest risk.

A handle recess 418 is provided in the front wall of the lower portion 398. An undersurface of the handle recess 418 (not shown) may be contoured to help a user grip and pull the secondary container 370 out of the cabinet 304. As best seen in FIG. 9, the cabinet 304 may be provided with a tab 420 that interacts with a lower edge of the lower portion 398 to assure that the secondary container 370 is at the appropriate location within the cabinet 304. A latching tab 420 can also help assure that when the door 306 is opened, the secondary container 370 is not accidentally withdrawn from the cabinet 304. To initiate disconnecting the secondary container 370 from the cabinet 304, the first step after opening the door 306, would be to release the tab 402, for example by pressing it, to permit the secondary container 370 to be slid forwardly out of the cabinet 304.

The outer wall 410 of the lower portion 398 is shaped to include a passageway 422 at the near a rear portion of the lower portion 398. This hose passageway 422 matches the general shape of the compound slot 388 formed in the lid 372. The purpose of the slot 422 is to permit the bucket fill hose 326 to pass from below the secondary container 370, through the container 370, and upwardly to the bucket fill attachment 320. The passageway 422 also opens to the rear of the lower portion 398, so that the hose 326 will not interfere with withdrawing the secondary container 370 out of the cabinet 304.

Figure 17:
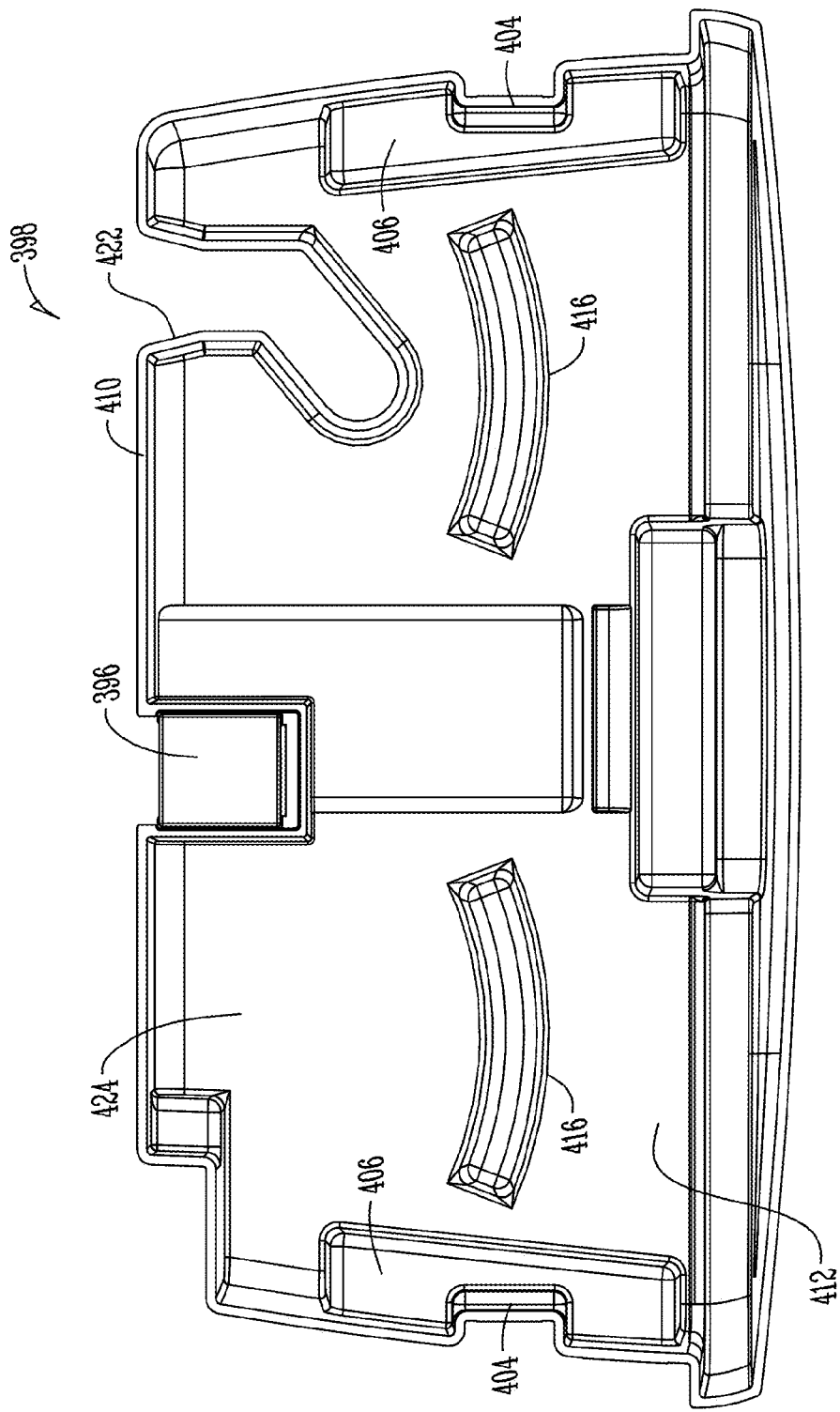
FIG. 17 is a top plan view of the secondary container of FIG. 16 without the lid.

As best seen in the top plan view of FIG. 17, the floor 412 of the bottom portion 398 of the secondary container 370 should be provided with at least one uninterrupted flat area 424. The flat area 424 should provide sufficient space between the outer walls 410 and the baffles 416 to place a neutralizing or absorbing agent. For example, socks, pillows, and powders are known products that can be used to neutralized, and/or, absorb concentrated product that has been spilled. Commercially available packets in the form of rectangular packets, elongated socks, or loose powder may be used to absorb and neutralize any concentrated chemicals. These products are available in commercially provided spill kits. Those with skill in the art will be well aware of various options for neutralizing and absorbing agents that can be placed within the provided flat area 422 to aid in the neutralizing and absorbing of spilled concentrated product that has fallen into the secondary container 370. Such neutralizing agents may be placed and left within the secondary container 370 in order to begin instantly neutralizing a spill as soon as it enters the secondary container 370. This can be especially beneficial in situations where fumes from the concentrated product might be especially toxic or harmful, or in high risk areas, such as prenatal, neonatal, or operating rooms.

As best seen in FIGS. 14 and 15, the cabinet 304 is provided with a guide 426 that extends forwardly from a rear wall of the cabinet 304. The guide 426 may be a member, such as a post or bar that extends from the rear wall and has a lower step 428 at the rear section of the guide 426 and an upper step 430 at the front end of the guide 426. The lower step 428 extends along the vast majority of the length of the guide 426, and provides a resting place for the flange 396 that extends upwardly from the lower portion 398 of the secondary container 370. The guide 426 may form a part of the wall that divides the storage area 310 from the dispensing area 312. A portion of the divider wall above the guide 426 may include a complimentary notch that follows along the lower 428 and upper 430 steps of the guide 426 such that the user cannot lift the flange 396 to a sufficient height to clear the front step 430 until the secondary container 370 is at least partially withdrawn from the cabinet 304.

In use, if it is determined that a spill from the product container 334 has occurred, a user may wish to remove the secondary container 370 from the cabinet 304 in order to appropriately dispose of the spilled product. As noted above, in some situations the secondary container 370 may be provided with a neutralizing agent, such as a powder or packet containing a powder that will help neutralize and absorb the concentrated product immediately upon it spilling into the secondary container 370. In order to remove or disconnect the secondary container 370 from the cabinet 304, a user will fully open the door 306, which may require opening a lock. Opening the door 306 is necessary in order to remove the door 306 from the movement path of the stop tabs 408. From this configuration, a user can press tab 420 on the bottom of the cabinet 304 to release the secondary container 370 for forward sliding. It should also be noted, that it may be necessary to reposition the hose 326 to the side of the cabinet 304 in order to prevent the hose 326 from interfering with forward movement of the secondary container 370 (see FIG. 14). The user can then slide the secondary container partly out of the cabinet 304 by pulling the secondary container 370 forwardly until the flange 396 is stopped by the upper step 430 of the guide 426. The upper step 430 serves to prevent the secondary container 370 from being pulled all the way out of the cabinet 304 in a single motion. This helps prevent accidental removal of the secondary container 370 from the cabinet 304. It also assures that a user must be supporting the weight of the secondary container 370 when they remove the secondary container 370 from the cabinet 304 to help prevent accidental tilting or dropping of the secondary container 370 which can result in spilling the contents of the secondary container 370. After the secondary container 370 is pulled forward such that the phalange 396 is stopped by the upper step 430 a user will grasp the handles 406 at the sides of the secondary container 370 and lift upwardly to clear the phalange 396 over the upper step 430 such that the secondary container 370 can be pulled completely clear from the cabinet 304.

Once the secondary container has been removed from the cabinet 304, a user may dispose of the spilled concentrated product by removing the lid 372. The neutralizing and absorbing packets can then be removed from the secondary container 320 and be safely disposed. Any liquid concentrate remaining in the secondary container can be safely disposed as well. The secondary container 370 can be cleaned, refilled with neutralizing or absorbing products, and slid back into place in the cabinet 304.

Figure 18:
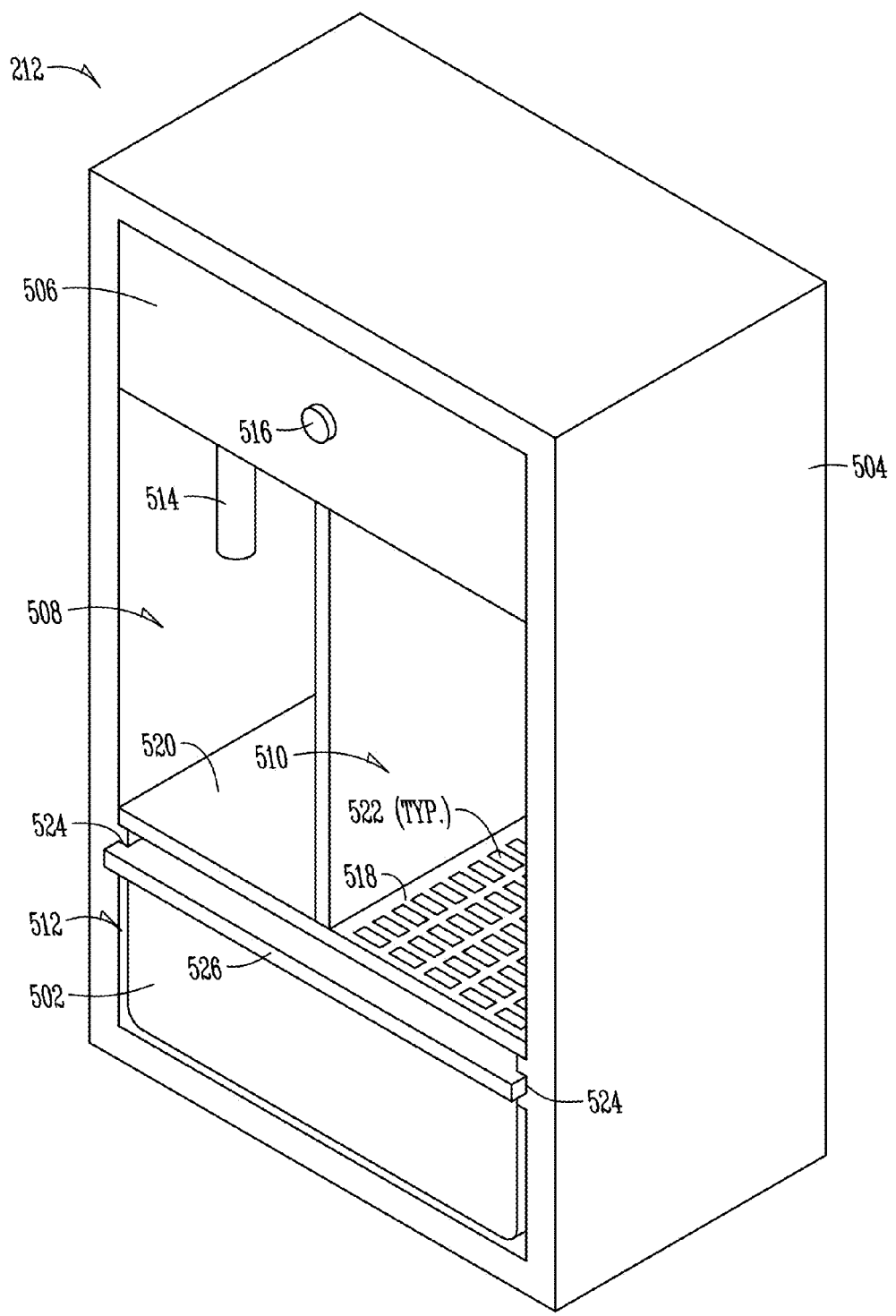
FIG. 18 is a dispenser according to another embodiment of the present invention, wherein a secondary container will slide out of the dispenser without a lid.
Figure 19:
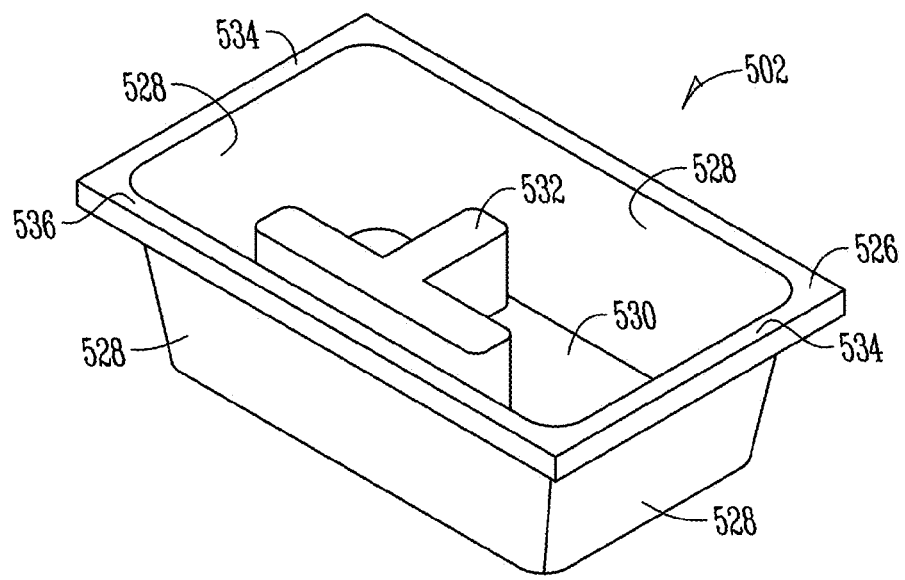
FIG. 19 is an isometric view of the secondary container of the dispenser of FIG. 18.
Figure 20:
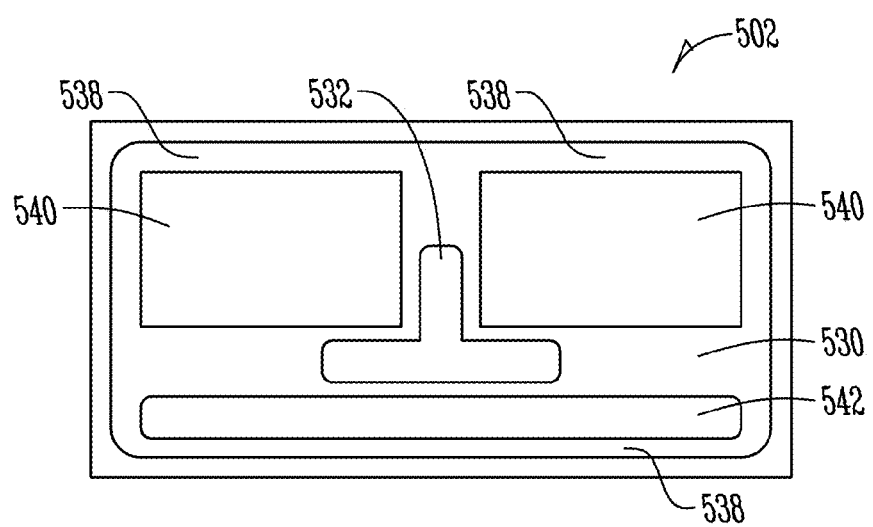
FIG. 20 is a top plan view of the secondary container of FIG. 19 with neutralizing packets and an absorbent packet resting on flat areas of the floor of the secondary container.

FIGS. 18-20 show an alternative embodiment of a dispenser 500 for dispensing a concentrated product. The dispenser 500 includes a secondary container 502 for catching and disposing any concentrated product that spills from the source container (not shown). Unlike the embodiment of FIGS. 4-17, in the embodiments of FIGS. 18-20 the secondary container 502 does not include a lid that disconnects from the dispenser 500 as part of the secondary container 502.

The dispenser 500 of FIG. 18 includes a housing 504 that is generally divided into an equipment compartment 506, a dispensing area 508, a storage compartment 510, and the secondary container area 512. The dispensing area 508 includes an outlet 514 for dispensing the concentrated product, or more preferably a mixture that includes the concentrated product in a diluted form. The storage compartment 510 is where the refillable or disposable container of the concentrated product (not shown) is stored. Also not shown is an apparatus for withdrawing the concentrated product from the product container. The equipment compartment 506 generally above the storage compartment 510 and the dispensing area 508 and includes equipment for drawing concentrated product out of the concentrated product container and moving it to the outlet 514, possibly while mixing the concentrated product with a diluent such as water. A control, such as button 516 is provided to permit a user to control the dispensing process. Preferably, a lockable door (not shown) may be provided to selectively close and secure the product container within the storage compartment 510.

A storage compartment 510 includes a floor 518. The floor 518 is supported by the walls of the housing 504. The floor 518 may be permanently secured to the housing 504 in a fixed manner. The dispensing area 508 also has a floor 520. According to one embodiment, the floor 520 and the floor 518 may be formed with a single piece of material. Alternatively, the floor 520 and floor 518 may be separate structures that are individually supported by the walls on the housing 504.

The floor 518 of the storage compartment 510 includes a series of drainage openings or slots 522. These drainage slots 522 permit any concentrated product that spills from the product container within the storage compartment 510 to drain downwardly into the secondary container area 512 where the spilled product will be caught and retained within the secondary container 502. The drainage openings 522 could take a variety of forms. For example, the floor 518 could be formed with a sloping bottom and single drainage hole as with the embodiment of the FIGS. 4-17. The floor 520 of the dispensing area need not include drainage holes, as it is likely that only a diluted mixture of the concentrated product could be spilled onto the floor 520, such that the user will be safe in directly cleaning such a spill. Alternatively, a drainage opening or openings could be provided in the floor 520 of the dispensing area.

Details of one structure for the secondary container 502 are shown in FIGS. 19 and 20. The secondary container 502 generally takes the form of a tray that can slide into and out of tracks 524 provided in the walls of the housing 504. Secondary container 502 includes an exterior lip 526 that generally extends laterally outwardly along the top perimeter of the secondary container 502. Outer walls 528 extend downwardly from an inner edge of the exterior lip 526 to a floor 530. A baffle 532 extends upwardly from the floor. The baffle 532 serves to help reduce sloshing of liquid within the secondary container 502 when the secondary container 502 is being moved. The side portions 534 will fit within tracks 524 of the housing 504, such that the secondary container 502 is slidably supported by the housing 504 at the tracks 524. The front lip portion 536 may be contoured to provide a grip for a user to pull the secondary container 502 outwardly to disconnect the secondary container 502 from the housing 504.

As seen in FIG. 20, the floor 530 may be provided with flat areas 538 that will accommodate spill packets 540 and spill sock 542. The spill packets 540 and spill sock 542 may be part of commercially available spill kits that include absorbent materials to absorb any products spilled into the secondary container 502 and neutralizing agents to chemically neutralize any concentrated product that spills into the secondary container 502. By including the spill packets 540 and spill sock 542 in the secondary container 502 when it is in use, small spills may be more or less instantly contained and neutralized. A user will be able to retract the secondary container 502 out of the housing 504 and dispose of the packets 540 and/or sock 542 to clean up the small spill. For larger spills, a user will need to dispose of excess liquid not absorbed by the packets 540 or sock 542, this can be accomplished by carrying the secondary container 502 to an appropriate disposal location. The baffle 532 will help prevent sloshing and spilling of the concentrated product during transportation of the secondary container 502 to an appropriate disposal location.

The forgoing description is of preferred examples for implementing the invention only, and the scope of the invention should not be limited by this description. Those of skill in the art will be aware of numerous additions and equivalent alternatives for implementing the invention. The scope of the invention is defined by the scope of the following claims.

What is claimed is:

1. A dispenser that dispenses a product, the dispenser comprising:
    a housing including a product holding area within the housing and a product dispensing area within the housing, said product holding area being at least partially enclosed and said dispensing area being open to an exterior of the housing to aid dispensing of a diluted mixture of a concentrated product;
    a product container containing a product positioned within the product holding area of the housing, the product having a product level within the product container that ranges between full and empty, the product level having a low level wherein the product level is near empty;
    a dispensing apparatus associated with the product container to withdraw and dispense product from the product container at an outlet, said dispensing apparatus associated with the dispensing area of the housing and said dispensing apparatus comprising an outlet tube extending generally downwardly from a portion of the dispensing apparatus a bucket fill assembly selectively attachable to the outlet tube for selectively dispensing from either or both of the tube or bucket fill assembly via the dispensing area;
    a container holder supporting the product container, the container holder being vertically moveable within a movement range;
    a biasing element supporting the container holder within the housing that urges the container holder upwardly such that a position of the product container in the movement range is dependent upon the product level in the product container;
    a level indicator vertically fixed relative to the housing; and
    a sign connected to the container holder such that the sign is vertically fixed relative to the container holder and such that the sign moves in a substantially vertical direction and substantially in sync with the container holder as the amount of product changes, the sign including a low level marking at an upper portion of the sign to indicate when the product level is at the low level or lower; and
    said sign being enclosed within the housing such that it is visible via the level indicator through or outside the housing regardless of the position of the sign in relation to the level;
    wherein when the product level is at the low level or lower, the level indicator is aligned with a portion of the low level marking.

2. The dispenser of claim 1, wherein when the product level is full, the container holder is at a bottom of the movement range, and further wherein the when the product level is between full and the low level, the container holder remains at the bottom of the movement range.

3. The dispenser of claim 1, wherein the biasing element comprises a pair of extension springs.

4. The dispenser of claim 3, further comprising:
    a U-shaped bracket, the U-shaped bracket having a base fixed to the housing and a pair of legs extending from the base, each leg including a spring attachment structure; and
    a pair of spring attachment hooks at an upper portion of the container holder; and
    wherein the pair of extension springs are connected between the spring attachment structures and the spring attachment hooks.

5. The dispenser of claim 1, wherein the level indicator is an opening through the housing.

6. The dispenser of claim 5, wherein the housing includes a product container holder compartment and a door that selectively opens and closes the product container holder compartment, and further wherein the opening is a window in the door.

7. The dispenser of claim 1, wherein:
    the container holder includes a pair of tabs that extending laterally from the container holder;
    the housing includes a pair of container holder guides to retain the container holder in the housing, each of the container holder guides including a generally vertically oriented channel; and
    the tabs each are received within a corresponding one of the channels.

8. The dispenser of claim 7, wherein the biasing element comprises a pair of compression springs extending between the container holder guides and the tabs.

9. The dispenser of claim 1, wherein the biasing element comprises a compression spring between the housing and a lower portion of the container holder.

10. A dispenser that dispenses a product and diluent mixture, the dispenser comprising:
- a housing including a product holding area within the housing and a product dispensing area within the housing, said product holding area being at least partially enclosed and said dispensing area being open to an exterior of the housing to aid dispensing of a diluted mixture of a concentrated product;
- an outlet in the dispensing area for dispensing the mixture, the outlet being in fluid communication with a diluent source and a product container, said outlet comprising an outlet tube extending generally downwardly from a portion of the dispensing apparatus and a bucket fill assembly selectively attachable to the outlet tube for selectively dispensing from either or both of the tube or bucket fill assembly via the dispensing area;
- a product container holder that supports the product container within the product holding area, the product container holder being vertically movable within a movement range between an upper limit and a lower limit;
- a level indicator vertically fixed relative to the housing;
- a sign attached to the container holder and positioned a fixed vertical distance such that vertical movement of the container holder within the movement range causes corresponding movement of the sign relative to the level indicator, the sign including a low level marking to indicate a low level of product remaining within the product container;
- a biasing device between the housing and the container holder that biases the container holder towards the upper limit of the movement range; and
- said sign being enclosed within the housing such that it is visible via the level indicator through or outside the housing regardless of the position of the sign in relation to the level;
- wherein, when the product container contains a low level of product, the biasing device moves the container holder to an intermediate position above the lower limit of the movement range thereby moving the sign to a low level position wherein the level indicator is aligned with the low level marking on the sign.

11. The dispenser of claim 10, wherein when the product container contains more than a low level of product, the container holder remains at the lower limit of the movement range.

12. The dispenser of claim 10, wherein the biasing element comprises a pair of extension springs.

13. The dispenser of claim 12, further comprising:
- a U-shaped bracket, the U-shaped bracket having a base fixed to the housing and a pair of legs extending from the base, each leg including a spring attachment structure; and
- a pair of spring attachment hooks at an upper portion of the container holder; and
- wherein the pair of extension springs are connected between the spring attachment structures and the spring attachment hooks.

14. The dispenser of claim 10, wherein the level indicator is an opening through the housing.

15. The dispenser of claim 14, wherein the housing comprises a door that selectively opens and closes the storage area, and further wherein the opening is in the door.

16. The dispenser of claim 10, wherein:
- the container holder includes a pair of tabs that extending laterally from the container holder;
- the housing includes a pair of container holder guides in the storage area to retain the container holder in the housing, each of the container holder guides including a generally vertically oriented channel; and
- the tabs each are received within a corresponding one of the channels.

17. The dispenser of claim 16, wherein the biasing element comprises a pair of compression springs extending between the container holder guides and the tabs.

18. The dispenser of claim 10, wherein the biasing element comprises a compression spring between the housing and a lower portion of the container holder.

19. The dispenser of claim 10, wherein the product is cleaning product.

20. The dispenser of claim 19, wherein the product comprises peroxyacetic acid and hydrogen peroxide.

* * * * *